US012267331B2

(12) United States Patent
Rathi et al.

(10) Patent No.: US 12,267,331 B2
(45) Date of Patent: Apr. 1, 2025

(54) PROOF OF AUTHORITY BASED ACCESS TO DEVICES ON A NETWORK WITH LOCAL TOKEN ACQUISITION

(71) Applicant: Brainwave Research Corporation, Woodbridge (CA)

(72) Inventors: Ghanshyam Rathi, Mississauga (CA); Prisha Rathi, Mississauga (CA)

(73) Assignee: ISHIELD TECH INC., Maple (CA)

( * ) Notice: Subject to any disclaimer, the term of this patent is extended or adjusted under 35 U.S.C. 154(b) by 139 days.

(21) Appl. No.: 17/693,220

(22) Filed: Mar. 11, 2022

(65) Prior Publication Data

US 2022/0407867 A1     Dec. 22, 2022

Related U.S. Application Data

(60) Provisional application No. 63/212,962, filed on Jun. 21, 2021.

(51) Int. Cl.
*G06F 7/04*     (2006.01)
*H04L 9/40*     (2022.01)
*H04W 4/80*     (2018.01)

(52) U.S. Cl.
CPC .......... *H04L 63/108* (2013.01); *H04L 63/08* (2013.01); *H04W 4/80* (2018.02)

(58) Field of Classification Search
CPC ......... H04L 63/108; H04L 63/08; H04L 9/50; G06F 21/335; G06F 21/44
See application file for complete search history.

(56) References Cited

U.S. PATENT DOCUMENTS

2017/0295157 A1   10/2017   Chavez et al.
2018/0302222 A1*  10/2018   Agrawal ................ H04W 4/70
(Continued)

FOREIGN PATENT DOCUMENTS

WO     201995691 A1   10/2019

OTHER PUBLICATIONS

Ronghua et al. Blend CAC: A Blockchain-Enabled Decentralized Capability-Based Access Control for IoTs, IEEE, Jul. 30, 2018, pp. 1027-1034. (Year: 2018).*

(Continued)

*Primary Examiner* — Philip J Chea
*Assistant Examiner* — Jenise E Jackson
(74) *Attorney, Agent, or Firm* — Smart & Biggar LP

(57) ABSTRACT

An access control method and system that uses a physical proximity interface on a token dispenser device to obtain tokens on a blockchain which are used for subsequent access to a local network. The tokens are authenticated on the local network using proof of authority authentication. A client device can present a token to the local network from anywhere in the world in order to access at least one device on the local network. In an example, the method includes receiving, from the physical proximity interface of the token dispenser device, a token on a blockchain layer; presenting, to a node of the local network, the token; and receiving, from the node, successful authentication of the token by way of proof of authority authentication. The method can include, after the successful authentication of the token, authorizing the client device to access a device on the local network.

120 Claims, 18 Drawing Sheets

(56) References Cited

U.S. PATENT DOCUMENTS

2020/0351660 A1 11/2020 Avetisov et al.
2021/0243028 A1* 8/2021 Song .................... H04L 9/3228

OTHER PUBLICATIONS

Altun et al, Blockchain Based Confidential Communication and Authorization Model for IoT Devices, IEEE, Nov. 2, 2019, pp. 1-6. (Year: 2019).*
Wood, Gavin, "PoA Private Chains", Github, Inc., Nov. 18, 2015, online: https://github.com/ethereum/guide/blob/master/poa.md.
International Search Report and Written Opinion of PCT/CA2022/050606 dated Jul. 8, 2022.

* cited by examiner

PROOF OF AUTHORITY BASED ACCESS TO DEVICES ON A NETWORK WITH LOCAL TOKEN ACQUISITION

CROSS-REFERENCE

This application claims the benefit of priority to U.S. Provisional Patent Application No. 63/212,962 filed Jun. 21, 2021 entitled PROOF OF AUTHORITY BASED ACCESS TO DEVICES ON A NETWORK WITH LOCAL TOKEN ACQUISITION, the entire contents of which are incorporated by reference into the Detailed Description herein below.

TECHNICAL FIELD

Example embodiments relate to access, authentication, and control of devices on a local network.

BACKGROUND

With the increase in Internet-of-Things (IOT) and connected devices, more and more devices are enabled for communication. However, communication devices can be vulnerable when they are connected to a local network such as WiFi or a global network such as the Internet. Access to communication devices could be compromised unless security features are implemented.

Some conventional security features are cumbersome and complicated. Some other conventional security features require identification and passwords.

An example problem occurs when a user wishes to secure one or more of their devices on a local network. The local network may be connected to the Internet, and the devices may be vulnerable to cybersecurity attacks. Yet, the user may wish to access the devices over the Internet in a secure manner when the user is remote from the local network.

It is desired to provide an access control system that is convenient to implement and allows secure access to devices on a local network from anywhere in the world.

It is desired to provide an access control system that locally dispenses tokens from a physical proximity interface at the local network and allows secure access to one or more devices upon presentation of the tokens from anywhere in the world.

Additional difficulties may be appreciated in view of the Detailed Description, herein below.

SUMMARY

At least some example embodiments relate access control methods and access control systems which include on-demand time-limited enabling of sensitive or secure device (s) for network access.

At least some example embodiments relate to the proof of authority based access to one or more of the device(s) on a local network with local token acquisition. The local network can be at or on a premises. In some examples, the premises can be a residence, office, campus, surgical suite or clinic, etc.

An example embodiment is an access control method. The access control method can be applied to a scenario in which a user wishes to securely access one or more devices at or on their premises. For example, the user may use a client device in order to access the devices. However, the user does not wish to grant unwanted parties any access to the devices. In some examples, the user may also wish to generate an immutable log of the type of access to each of the devices.

In an example embodiment, the access control system dispenses tokens from a physical proximity interface at the local network and allows secure access to one or more devices upon presentation of the tokens from anywhere in the world.

In an example embodiment, the access control method is used to secure devices on the local network by blockchain implementation. For example, the client device is used to obtain one or more tokens through physical proximity interface, e.g. by being in close proximity, tapping or plugging in the client device to a token dispenser device. The client device can thereafter present the token for proof of authority authentication in order to access at least one of the devices on the local network.

In an example embodiment, after presentation and authentication of the token on the local network, the client device is granted authorized access to various applications and devices that include home appliance control, garage door openers, vehicles, power monitoring and control, control of a switch or relay, and telerobotics (e.g. telerobotic surgery or diagnostic procedures). The device can be a computer on the local network, for example a personal computer, a server, or a mobile device. The authorized access can be granted even when the client device is remote from the local network, for example via the Internet. The authorized access between the device and the client device can continue when the device leaves the local network, for example in the case of a vehicle that drives away from the premises.

In some example embodiments, the device can be an air pressure switch control that creates a negative air pressure in a closed environment, such as an enclosed surgical suite.

In an example embodiment, the device is a vehicle on a premises. When the user is on the premises (e.g. the driveway or garage), the client device can present the token on the local network to request proof of authority authentication, by starting a transaction on the blockchain using the private key. Secure access to the vehicle is granted through proof of authority authentication. The user can drive away with the vehicle, with the client device still on board (e.g. in the user's pocket or purse) and with continuous authorized access to the vehicle after leaving the premises.

In another example embodiment, the client device is granted authorized access to a switch. For example, the switch can be for a critical system such as an artillery activation, a part of a utility grid, power to a device, or a breaker panel. The switch can be activated (or opened in the case of a breaker) or deactivated (or closed in the case of a breaker).

Another example embodiment is an access control method performed by a client device, comprising: receiving, from a physical proximity interface of a token dispenser device, a token on a blockchain layer; presenting, to a node of local network, the token; and receiving, from the node, successful authentication of the token by way of proof of authority authentication.

Another example embodiment is an access control method, comprising: sending, from a physical proximity interface of a token dispenser device to a client device, a token on a blockchain layer; receiving, at a node of a local network from the client device, presentation of the token; requesting, from the node, authentication of the token using proof of authority authentication; and sending, from the node to the client device, successful authentication of the token.

Another example embodiment is an access control system, comprising: a token dispenser device including a physical proximity interface, the token dispenser device configured to send, from the physical proximity interface to a client device, a token on a blockchain layer; and a node on a local network configured to: receive, from the client device, presentation of the token, request authentication of the token using proof of authority authentication, and transmit, to the client device, successful authentication of the token.

Another example embodiment is a token dispensing device, comprising: a communications subsystem that includes at least one physical proximity interface; a processor configured to: receive at least one token on a blockchain layer; and dispense, in response to engagement through the physical proximity interface, at least one of the tokens.

Another example embodiment is a smart home system, comprising: a token dispenser device including a physical proximity interface, the token dispenser device configured to send, from the physical proximity interface to a client device, a token on a blockchain layer; and a node on a local network configured to: receive, from the client device, the token, request authentication of the token using proof of authority authentication, transmit, to the client device, successful authentication of the token, and authorize, after the successful authentication of the token, access of the client device to a device on the local network, wherein the device is a home device.

Another example embodiment is a vehicle system, comprising: a token dispenser device including a physical proximity interface, the token dispenser device configured to send, from the to a client device, a token on a blockchain layer; and a node on a local network configured to: receive, from the client device, the token, request authentication of the token using proof of authority authentication, transmit, to the client device, successful authentication of the token, and authorize, after the successful authentication of the token, access of the client device to a device on the local network, wherein the device is a vehicle or a subsystem of the vehicle.

Another example embodiment is a telerobotics system, comprising: a token dispenser device including a physical proximity interface, the token dispenser device configured to send, from the physical proximity interface to a client device, a token on a blockchain layer; and a node on a local network configured to: receive, from the client device over the Internet, the token, request authentication of the token using proof of authority authentication, transmit, to the client device, successful authentication of the token, and authorize, after the successful authentication of the token, access of the client device to a device on the local network, wherein the device is a robotic device, a sensor, and/or an air pressure switch control.

Another example embodiment is a method, comprising: receiving, by a node, an instruction to reset a blockchain; and resetting the blockchain layer.

Another example embodiment is a non-transitory memory containing instructions which, when executed by a processor, cause the processor to perform the access control method or method of any of the above.

An advantage of the access control method and the access control system is that cybersecurity is improved.

BRIEF DESCRIPTION OF THE DRAWINGS

Reference will now be made, by way of example, to the accompanying drawings which show example embodiments, and in which.

Similar reference numerals may have been used in different figures to denote similar components.

DETAILED DESCRIPTION

Figure 1A:
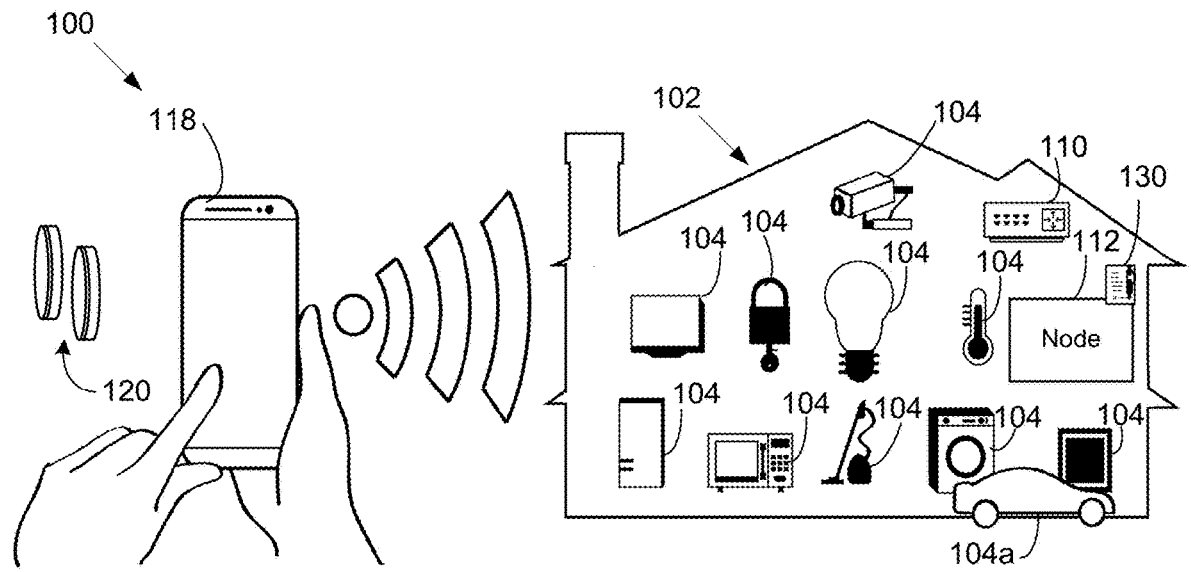
FIG. 1A illustrates an example access control system and access control method, in accordance with an example embodiment.

Example embodiments relate to the proof of authority based access to one or more devices on a local network with local token acquisition. The local network can be at or on a premises. In some examples, the premises can be a residence, office, campus, surgical suite or clinic, etc.

An example embodiment is an access control method. The access control method can be applied to a scenario in which a user wishes to securely access one or more devices at or on their premises. For example, the user may use a client device in order to access the devices. However, the user does not wish to grant unwanted parties any access to the devices. In some examples, the user may also wish to generate an immutable log of the type of access to each of the devices.

In an example embodiment, the access control system dispenses tokens from a physical proximity interface at the local network and allows secure access to one or more devices upon presentation of the tokens from anywhere in the world.

In an example embodiment, the access control method is used to secure devices on the local network by blockchain implementation. For example, the client device is used to obtain one or more tokens through a physical proximity interface, e.g. by tapping or plugging in the client device to a token dispenser device. The client device can thereafter present the token for proof of authority authentication in order to access at least one of the devices on the local network.

An advantage of the access control method and the access control system is that cybersecurity is improved.

Blockchain is a database that is kept synchronized across all the participating nodes by implementation specific protocols. The blockchain holds a list of transactions, and optionally other information such as administrative information. The blockchain is also used to perform and authenticate the transactions.

Blockchain is often compared with a bank ledger that holds the transaction information. However, there is a subtle difference. A bank account holds current balance as a part of the database, whereas a blockchain database may hold only transactions with information such as "from" account, "to" account and "value" of the transaction etc. Miners or sealers validate a transaction by walking down the blockchain to verify whether the said "from" account has sufficient balance required for the transaction from all previous transactions involving the said account.

The term "token" is used in many contexts in the domain of blockchain and crypto-currencies. The token may represent the "value" that is transferred from one account to the other in the context of a transaction, and the token may represent an account on the blockchain itself (with an associated private key) that "contains" the value of the token when token is "purchased" or transferred from an exchange (buying tokens).

It may be useful to think of a token as a "value representation". In the domain of blockchain, all values are recorded in the blockchain database in the form of immutable blocks of information. So possessing a token simply implies the ownership of the private key for the account on the blockchain that represents the value of the token. Only the ownership of the private key of any account enables the transaction that involves value transfer from that account to some other account.

Ethereum™ is a platform designed for decentralized applications. Ethereum uses blockchain technology to produce currency tokens (also referred to as tokens or coins), and also allow for smart contracts to be distributed securely on the blockchain network. Public blockchain networks can be unsecure. It is the blockchain database that secures the transactions.

These smart contracts are computer programs coded with functions that are located on an address in the blockchain network. The smart contracts are secure and immutable and allow for data and information exchanges.

Ethereum is flexible and allows for different forms of authentication for the blockchain network such as i) proof of work, ii) proof of stake, and iii) proof of authority. Proof-of-work allows for blockchain nodes to try and complete a mathematical plug and chug problem provided by the network. Once successfully solved, the blockchain node creates or mines the next block on the blockchain. Proof of work authentication is suited for publicly distributed networks where other blockchain nodes are unknown and cannot be trusted. For proof of stake, blockchain nodes with the largest amount of currency tokens controls the sealing and approval of the blocks. Proof of stake authentication is also used in a public setting with untrusted networks. Proof of authority authentication is another form of authentication where there are designated blockchain nodes on the network tasked to seal and approve blocks created by master devices (also known as authority nodes or master nodes). Proof of authority authentication is less tedious, less expensive, and consumes a significantly smaller amount of power compared to proof-of-work, and is better suited for private blockchain networks where every blockchain node is known and accounted for. Proof of authority authentication is described in detail by Wood, Gavin, "PoA Private Chains", Github, November 2015, web site: https://github.com/ethereum/guide/blob/master/poa.md, incorporated herein by reference. Gavin Wood is a cofounder of Ethereum.

Example embodiments relate to an access control method and system that uses a physical proximity interface from a token dispenser device to obtain tokens which are used for subsequent access to a local network. The tokens are authenticated on the local network using proof of authority authentication.

Reference is now made to FIG. 1A, which illustrates an example of the access control system 100 and the access control method, as applied to a premises 102 having a local network. The illustrated example of the premises 102 is a residence (e.g., house). Other examples of the premises 102 include a company, vessel, building or campus, etc. As illustrated in FIG. 1A, the access control method can be applied to a scenario in which a user wishes to securely access one or more devices 104 at or on their premises 102. For example, the user may use a client device 118 in order to access the devices 104. However, the user does not wish to grant unwanted parties any access to the devices 104. In some examples, the user may also wish to generate an immutable log (also called a transaction) of the type of access to each of the devices 104.

At least one router 110 (one shown) can define the local network which communicates with the devices 104. The router 110 is configured for connection over the Internet. The router 110 can be configured for wireless and wired communication. The router 110 can be configured to define networks with wireless communication (wireless networks) and wired communication (wired networks), with suitable protocols. In an example, the wired network protocol of the router 110 can be an Ethernet protocol and the communication interface can be RS485. The local network can include additional devices, nodes, routers, gateways, authenticators, nodes, wires, outlets, ports, etc. The local network can be a local area network (LAN). The local network can be referred to as a home network when the premises 102 is a residence, and the devices can be referred to as home devices. The access control system 100 can be referred to as a smart home system when the premises 102 is a residence. In other examples, not shown here, the local network can be referred to as an enterprise network when the premises 102 is on an enterprise such as business.

Upon successful authentication by the node 112 (through proof of authority by the master device 108), the client device 118 can be used (is authorized) to access the devices 104, while on the local network or remotely via the Internet. The client device 118 can be used to access data from or to provide instructions (e.g. controls and commands) to the devices 104. Upon successful authentication by the node 112, one or more of the devices 104 can be authorized to provide data to the client device 118. Upon successful authentication by the node 112, one or more of the devices can now receive the instructions from client device 118, in order to execute controls and commands. In the illustrated example scenario of the residence, examples of the devices 104 can include security or other monitoring devices (e.g. cameras which can be integrated into a doorbell or baby monitor, or audio devices having microphones and optionally speakers), televisions, locks (e.g. front door lock), lighting, heating, ventilation and air conditioning (HVAC) devices, appliances (such as refrigerators, microwaves, vacuums, washing machines, dishwashers), and/or vehicles 104*a*. In some examples, the device 104 can be a computer on the local network, for example a personal computer, a server, or a mobile device. In some examples, the device 104 can be an air pressure switch control.

A user may wish to grant access to any of the devices 104 in a secure, efficient, and convenient manner. In an example, a token dispenser device 106 is configured to dispense tokens 120. The token dispenser device 106 can dispense one or more tokens 120 at a time, depending on the particular application or implementation. In an example, for additional security, the token dispenser device 106 is wiredly connected to a master device 108 (see FIGS. 3 and 4). When another second client device 118 presents a second (authentic) token 120, at the same time or at a different time, then that second client device 118 will be authenticated and will have access to the local network or at least one of the devices 104. When another second client device 118 presents an improper token, or no token, then that second client device 118 will not be authenticated and the second device 118 will not have access to the local network or any of the devices 104.

In an example, each token 120 is based on a private key having a unique numeric sequence or unique alphanumeric sequence that can be authenticated on the local network using proof of authority authentication. In an example, each token 120 is associated with a blockchain token or currency token. In an example, the blockchain token is an Ethereum token, e.g. an Ethereum Request for Comment 20 (ERC-20) token. In an example, the blockchain token is generated by one or more private blockchain devices on the local network, such as a master device 108, described in greater detail herein in relation to FIGS. 3 and 4.

In examples, the token dispenser device 106 is a standalone dedicated computer device, a part of another computer device, or a module for connecting to a computer device. In an example, the token dispenser device 106 has a physical proximity interface for receiving tokens 120 from the master device 108. In an example, the token dispenser device 106 uses the physical proximity interface for dispensing of the tokens 120. The client device 118 receives a token 120 on the blockchain by communicating over the physical proximity interface of the token dispenser device 106. Examples of the physical proximity interface include a physical contact interface such as a port, or a Universal Serial Bus (USB) interface, or short-range communication modules such as Radiofrequency identification (RFID) interface and Near-Field Communication (NFC) interface. For example, the client device 118 can obtain the token 120 by tapping (physically touching) or being in physical proximity to the physical proximity interface when the physical proximity interface is a Radiofrequency identification (RFID) interface or a Near-Field Communication (NFC) interface. For example, the client device 118 can obtain the token 120 by plugging (e.g. directly or via a cable) into the physical contact interface when the physical contact interface is a USB interface or an Ethernet interface (port). The client device 118 can store the received token 120 in memory of the client device 118.

In an example, when the client device 118 is remote (e.g. on the Internet) or on the local network, a user may wish to use the client device 118 in order to access one or more of the devices 104 on the premises 102. In an example, the client device 118 presents the token 120 to the access control system 100 for authentication, for example by starting a transaction on the blockchain. Upon presentation of a token 120, an example of the authentication is proof of authority authentication, for example Ethereum proof of authority authentication by processing of a smart contract 130. Once authenticated, the client device 118 is granted access to one or more of the devices 104. The particular devices 104 being accessed can depend on the particular implementation or application. In another example, upon successful authentication by the node 112, the client device 118 is granted access to the entire local network and/or at least one or all of the devices 104 on the local network.

In an example, a token 120 can be used for single access to a device 104 or the local network. The token 120, after being authenticated by way of proof of authority authentication, allows single access to the device 104. An example of the single access is a single data request or a single instruction. For example, the device 104 is authorized to send data to the client device 118. Examples of the data from the device 104 include sensor data, image data, Internet-Of-Things (IOT) data, or user input data entered through the device 104. For example, the device 104 is authorized to receive instructions (e.g. commands or controls) from the client device 118.

In an example, a token 120 can be used for continuous access for a time period to a device 104 or the local network. The token 120, after being authenticated by way of proof of authority authentication, allows continuous access to the device 104 for the time period. In an example, the time period is indefinite until access is removed by a node 112 such as an authorization service provider. In another example, the time period is terminated after a specified time period, a specified event, or a specified session between the device 104 and the client device 118. For example, the device 104 is authorized to send data to the client device 118 for the time period, until expiration of the time period. For example, the device 104 is authorized to receive instructions (e.g. commands or controls) from the client device 118 for the time period, until expiration of the time period.

In an example, after presentation of the token 120, the token 120 is verified by way of proof of authority authentication using a blockchain of a blockchain layer. After the proof of authority authentication is completed, an immutable entry is made on the blockchain in the form of a transaction. With the new blockchain having an added transaction, all previous entries can be audited.

In an example, the access control method illustrated in FIG. 1A is continuously and repeatedly performed by the access control system 100, for generation of the tokens 120, sending of one or more of the tokens 120 to the client device 118 through the physical proximity interface of the token dispensing device 106, and providing access by the client device 118 to at least one of the devices 104 upon presentation of a token 120. Other client devices 118 can also retrieve unique tokens 120 through the physical proximity interface of the token dispensing device 106, and access at least one of the devices 104 upon presentation of a token 120.

Figure 1B:
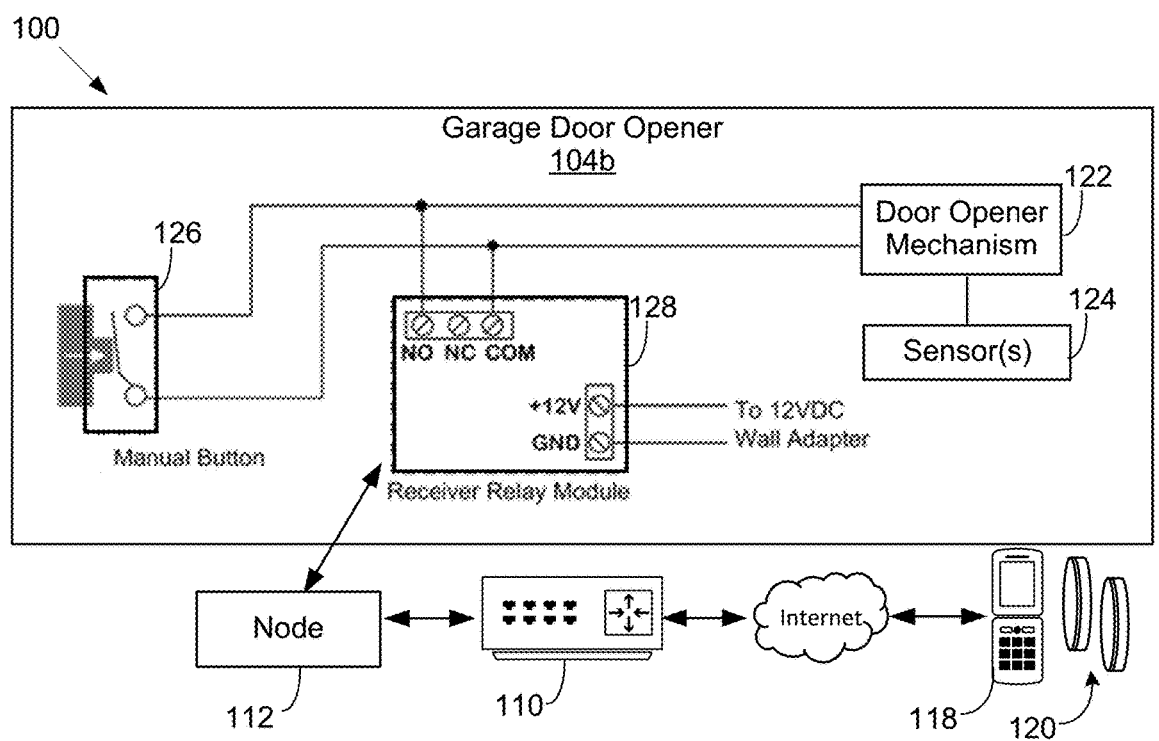
FIG. 1B illustrates an example of the access control system and access control method of FIG. 1A, for a garage door opener, in accordance with an example embodiment.

FIG. 1B illustrates an example of the access control system 100 and access control method of FIG. 1A, in an example scenario when one of the devices 104 is a garage door opener 104b, in accordance with an example embodiment. The garage door opener 104b can include a door opener mechanism 122, one or more sensors 124, a manual button 126, and a receiver relay module 128.

As illustrated in FIG. 1B, the access control method can be applied to a scenario in which a user wishes to securely access the garage door opener 104b in order to open and close the garage on their premises 102. The example similarly applies to gates, automatic doors, vaults, etc. For example, the user may use the client device 118 in order to access the garage door opener 104b. However, the user does not wish to grant unwanted parties any access to the garage door opener 104b, especially from remote locations.

The manual button 126 is manually selectable (e.g. by pushing a button or entering a keypad code) on the premises 102 to activate the door opener mechanism 122. The door opener mechanism 122 can include switches, chains, motors, gears, pulleys, etc. (not shown). The manual button 126 is typically wiredly connected to the door opener mechanism 122. The receiver relay module 128 can receive a wireless signal and, in response, activate the door opener mechanism 122. The sensors 124 are also used to control the door opener mechanism 122, and can include sensors that detect when the door is open or closed, or if there is an obstruction (such as a human) that prevents closing the door. In an example, the receiver relay module 128 can relay data to the client device 118, such as sensor data of the sensors 124, data logs on opening and closing state of the door, etc.

At least one router 110 (one shown here) can define the local network for the premises 102, and which communicates with the receiver relay module 128 of the garage door opener 104b. The router 110 be configured for connection over the Internet. The router 110 be configured for wireless and wired communication. The router 110 can be configured for communication using one or more of the Institute of Electrical and Electronics Engineers (IEEE) family of standards.

At least one node, denoted node 112 (one shown here) initiates authentication of the tokens 120 by requesting proof of authority authentication. The proof of authority authentication can be performed by using a smart contract 130 on the blockchain. Upon successful proof of authority authentication, the node 112 advises the client device 118 that the client device 118 is authenticated. Upon successful proof of authority authentication, a block is added to the blockchain at issue.

Upon successful authentication by the node 112, the client device 118 can be used to access the garage door opener 104b, while on the local network or remotely via the Internet. The client device 118 can be used to access data from or to provide instructions (e.g. controls and commands) to the garage door opener 104b to activate the door opener mechanism. Upon successful authentication by the node 112, the receiver relay module 128 can be configured to provide data to the client device 118. The receiver relay module 128 can be connected to a power supply (+12V) and ground (GND). The receiver relay module 128 can include a relay that activates power from the power supply to the door opener mechanism 122.

A user may wish to grant access to the garage door opener 104b in a secure, efficient, and convenient manner. In an example, the token dispenser device 106 is physically available on the premises 102 and is configured to dispense tokens 120. When another second client device 118 presents an improper token, or no token, then that second client device 118 will not be authenticated by the node 112 and will not have access to the local network or any of the devices 104 (including the garage door opener 104b). In particular, the second client device 118 that does not have physical proximity or physical contact with the token dispenser device 106 will not be able to access any tokens 120.

In an example, the node 112 is an intermediary to the receiver relay module 128 and is configured to pass any authorized access (e.g., instructions or data) with the receiver relay module 128. In another example, after the node 112 authenticates the client device 118, the node 112 instructs the receiver relay module 128 that all communications from the client device 118 are authorized (e.g. within the authorized time period) and does not need to act as an intermediary. In another example, after the node 112 authenticates the client device 118, the node 112 advises the router 110 or an authentication server (e.g., an authentication, authorization, and accounting (AAA) server or Radius server) to authorize the client device 118 to have access to any device 104 on the local network (including the garage door opener 104b). In another example, the node 112 instructs both the device 104 and the router 110 (and/or the authentication server) that the client device 118 has authorized access.

When another second client device 118 presents an improper token, or no token, then that second client device 118 will not be authenticated and will not have access to the local network or any of the devices 104. When another second client device 118 presents a second token that is a proper token, then that second client device 118 will be authenticated and will have access to the local network or any of the devices 104.

In an example, the client device 118 receives a token 120 on the blockchain by communicating over the physical proximity interface of the token dispenser device 106, for example by tapping or by plugging (e.g. directly or via a cable) into the physical proximity interface. The client device 118 can store a private key associated with the token 120 in memory of the client device 118. In an example, at a later time the client device 118 may wish to access the garage door opener 104b (either via the Internet or while on the local network). The client device 118 presents the token to the node 112 for proof of authority authentication, by starting a transaction using the private key. Upon successful authentication by the node 112, secure access is granted by the node 112 to the garage door opener 104b.

Conveniently, in an example, the user of the client device 118 can physically contact or tap the client device 118 to the token dispenser device 106 whenever tokens 120 are desired. The tokens 120 can be presented at a later time for authentication of the client device 118. Whenever the user requires additional tokens 120, the user of the client device 118 can physically contact or tap the client device 118 to the token dispenser device 106 to obtain more tokens 120. In an example, no identification or credentials are required to obtain tokens 120. Rather, in such an example, the close proximity and physical proximity interface between the client device 118 and the token dispenser device 106 are used as the primary security barrier for obtaining new tokens 120. In an example, the tokens 120 are only generated on the local network and are transmitted and dispensed through only physical proximity interfaces and wired connections, therefore increasing security by having all handling of the tokens 120 being done through physical proximity interfaces and wired connections.

In an example, a token 120 can be used for single access to the garage door opener 104b or the local network. The token 120, after being authenticated by way of proof of authority authentication, is allowed single access to the garage door opener 104b. For example, the garage door opener 104b is authorized to send data to the client device 118. For example, the garage door opener 104b is authorized to receive instructions (e.g. commands or controls) from the client device 118 to perform one instance of open or close. In such an example, more tokens 120 are acquired from the token dispenser device 106 through the physical proximity interface (e.g. tapping or plugging), when more access is desired.

In an example, a token 120 can be used for continuous access for a time period to the garage door opener 104b or the local network. The token 120, after being authenticated by way of proof of authority authentication, allows continuous access to the garage door opener 104b for the time period. In an example, the time period is indefinite until access is removed from the local network.

In an example, after presentation of the token 120 to the node 112, the token 120 is verified by the node 112, in which the node 112 requests proof of authority authentication using a smart contract 130 and a blockchain of a blockchain layer. After the proof of authority authentication is completed, an immutable entry can be made on the blockchain in the form of a transaction.

In an example, the access control method illustrated in FIG. 1B is continuously and repeatedly performed by the access control system 100, for generation of the tokens 120, sending of one or more of the tokens 120 to the client device 118 through the physical proximity interface of the token dispensing device 106, and providing access by the client device 118 to the garage door opener 104b upon presentation of a token 120. Other client devices 118 can also retrieve unique tokens 120 through the physical proximity interface of the token dispensing device 106, and access to the garage door opener 104b upon presentation of a token 120. Therefore, the garage door opener 104b can be securely opened and closed using the client device 118, and data logs can be securely accessed by the client device 118.

Figure 1C:
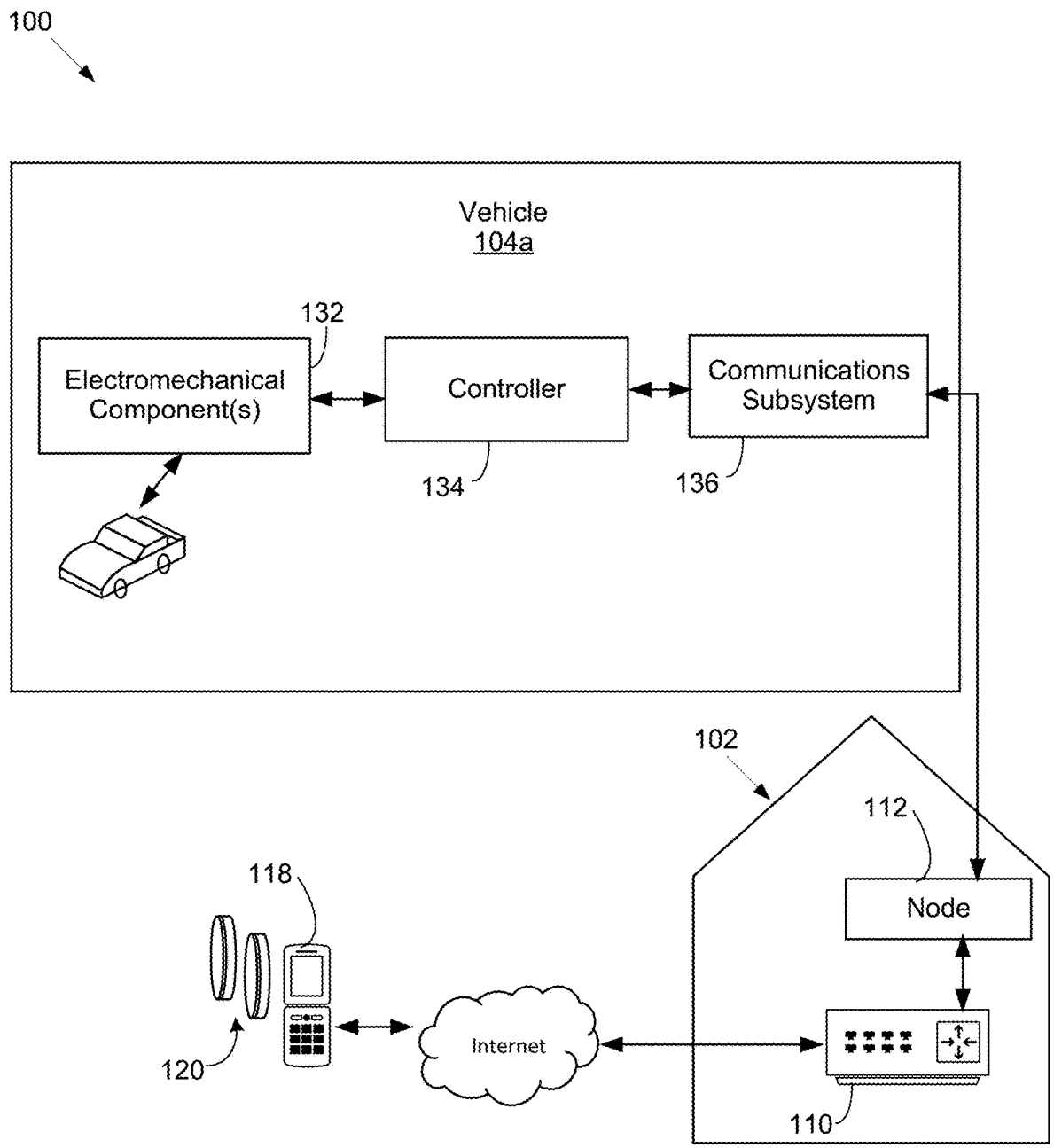
FIG. 1C illustrates an example of the access control system and access control method of FIG. 1A, for a vehicle, in accordance with an example embodiment.

FIG. 1C illustrates an example of the access control system 100 and access control method of FIG. 1A, in an example scenario when one of the devices 104 is a vehicle 104a, in accordance with an example embodiment. The vehicle 104a can include electromechanical components 132, a controller 134 and a communications subsystem 136. The electromechanical components 132 can include an ignition control module, a steering module, gas module, brake module, battery module, fuel module, a door lock module, a window opener module, mapping module (including a Global Positioning System, GPS), and one or more sensors that can be used to sense the environment of the vehicle 104a. The ignition control module activates the ignition of the vehicle 104a upon authorization or detection of a key or keyless remote. In some examples, the vehicle 104a can be an autonomous driving vehicle (fully autonomous or semi-autonomous). The communications subsystem 136 can included wireless and/or wired communications to the local network of the premises 102.

As illustrated in FIG. 1C, the access control method can be applied to a scenario in which a user wishes to securely access the vehicle 104a in order to control the vehicle 104a or obtain data from the vehicle 104a. In an example, the user may wish to drive the vehicle 104a, either autonomously or manually. However, the user does not wish to grant unwanted parties any access to the vehicle 104a, especially from remote locations.

In the example scenario, the user may wish to have authenticated access to the vehicle 104a using the client device 118. In some examples, the client device 118 is used to access the steering module, gas module, brake module, battery module, fuel module, door lock module, window opener module, mapping module (including a Global Positioning System GPS), and the sensors. The sensors are also used by the controller 134 as feedback information in order to control the electromechanical components 132, for example for autonomous driving. In an example, the controller 134 can relay data to the client device 118, such as sensor data of the sensors, data logs on travel from the mapping module or fuel consumption, etc.

In an example, all of the access to the electromechanical components 132 is performed through the controller 134. In another example, the controller 134 informs the electromechanical components 132 (or at least one electromechanical component 132 of interest) that the client device 118 is authorized, and thereafter the electromechanical components 132 can communicate directly with the client device 118.

For example, once the client device 118 is authenticated through the node 112 and at the premises 102, the user can drive or sit in the vehicle 104a with the client device 118 in their pocket and drive away from the premises 102. Thereafter, the controller 134 will continue to authorize (permit) access from the client device 118 to the electromechanical components 132.

In an example, the token dispenser device 106 is on the premises 102 and is configured to dispense tokens 120. In an example, the client device 118 receives a token 120 on the blockchain by communicating over the physical proximity interface of the token dispenser device 106, for example by tapping or by plugging (e.g. directly or via a cable) into the physical proximity interface. The client device 118 can receive the token by receiving (and storing) a private key associated with the token 120 in memory of the client device 118. In an example, the client device 118 then may wish to access the vehicle 104a (while the user is sitting in the vehicle 104a). Initially, the vehicle 104a is still on the premises 102 (e.g. the driveway or garage) and is still connected to the local network. The client device 118 presents the token 120 to the node 112 for the node 112 to request proof of authority authentication, by starting a transaction on the blockchain using the private key. Secure access is granted through the node 112 to the vehicle 104a. The user can drive away with the vehicle 104a, with the client device 118 still on board (e.g. in the user's pocket or purse) and with continuous authorized access to the vehicle 104a after leaving the premises. When another second client device 118 presents an improper token, or no token, then that second client device 118 will not be authenticated by the node 112 and will not have access to the local network or any of the devices 104 (including the vehicle 104a). In particular, when the second client device 118 did not have any physical proximity or physical contact with the token dispenser device 106 will not be able to access any tokens 120.

An example of the vehicle 104a is a vehicle enabled with OnStar™. In an example, the vehicle 104a enabled with OnStar has additional protection based on blockchain security. For example, the vehicle 104a will not accept commands unless command comes from an authorized source such as the client device 118 once authorized through the blockchain.

Figure 1D:
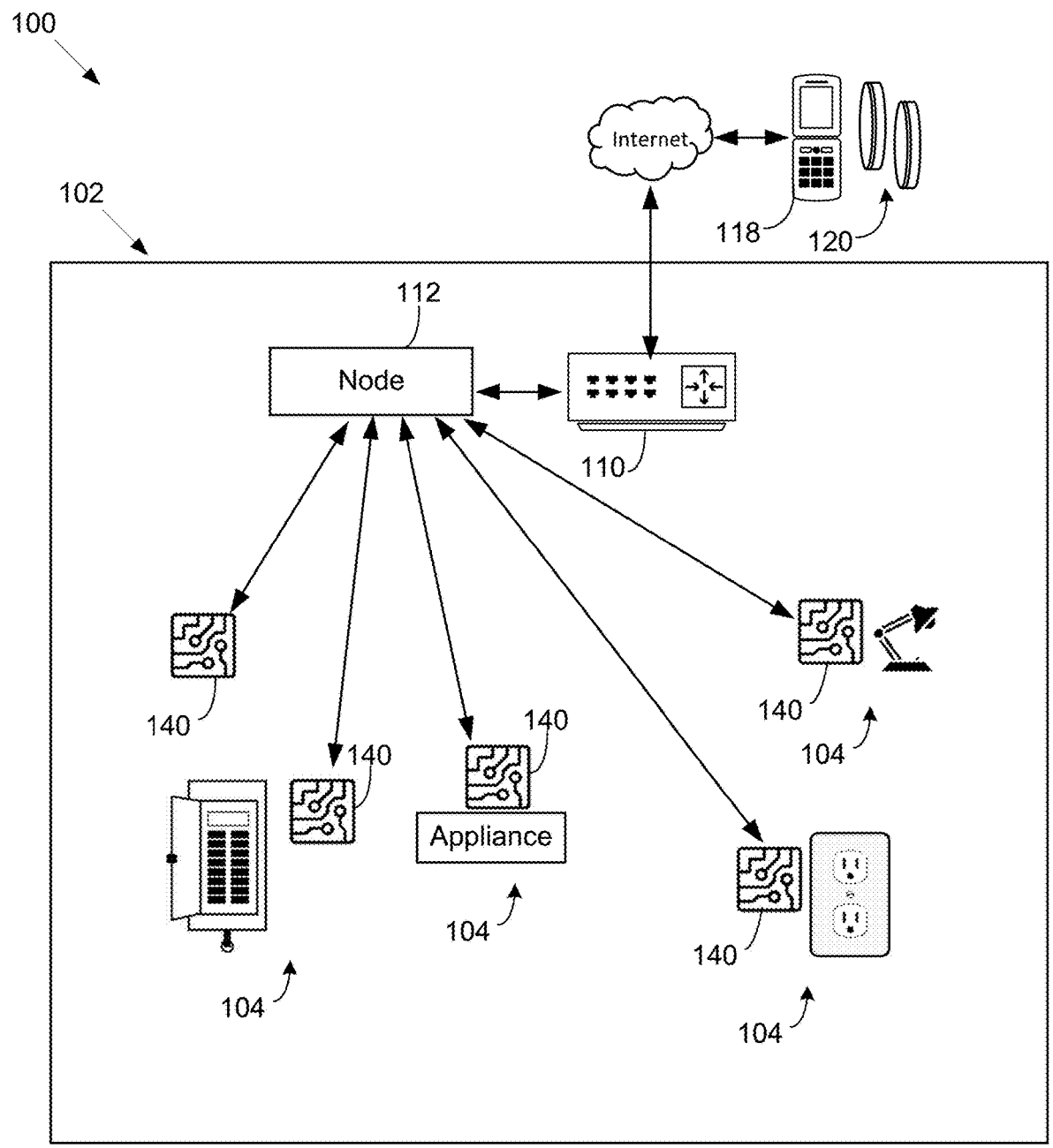
FIG. 1D illustrates an example of the access control system and access control method of FIG. 1A, for a power monitoring and control system, in accordance with an example embodiment.

FIG. 1D illustrates an example of the access control system 100 and access control method of FIG. 1A, for a power monitoring and control system, in accordance with an example embodiment. The access control system 100 includes one or more power control modules 140. The power control module 140 can have a communication interface (not shown) configured for wired communication and/or wireless communication. The power control module 140 is configured for power control, for example by opening or closing a switch to provide power. In an example, the power control module 140 is configured for power monitoring, which can include a sensor to detect a power signal, voltage signal, or current signal sensing, and can be configure to perform real-time calculations on the detected signals. In an example, the power control module 140 is configured for detecting temperature, vibration, and/or noise. The power control module 140 can be a circuit board or microchip, as shown. The power control module 140 can be a power delivery unit with built-in electrical safety. The power control module 140 can be configured to protect against electrical faults and hazards such as over/under voltage, over current, or outlet tamper. The power control module 140 can have a built in ground fault interrupt (GFI) and arc-fault circuit interrupter (AFCI) to protect against ground faults, and series and parallel arc faults to distribute safe power. The power control module 140 is configured to use Modbus RTU protocol to allow for continuous power monitoring including electrical signal waveforms such as voltage, current and power factor.

In an example, the power control module 140 is integrated into the device 104. Examples of the devices 104 that can include the power control module 140 include (as shown): breaker panels, appliances, electrical receptacles, and lighting. The electrical receptacle can have at least one power outlet. The electrical receptacle can be an in-wall receptacle, an in-line receptacle, a power bar, or an extension cord.

In some examples, the signals detected by the power control module 140 can be sent to the client device 118. In some examples, the client device 118 can be used to control the power control module 140, for example to distribute power, open a switch or breaker, etc. In an example, the node 112 is an intermediary between the devices and the client device 118, and routes or relays data flow and instructions. In another example, the node 112 authenticates the client device 118 and advises the devices 104 that the client device 118 is authorized to access the devices 104, after which the node 112 is not necessarily involved in subsequent access between the devices 104 and the client device 118.

In an example, the local network includes a wired network over one or more power lines. For example, wired communication is performed over the hot power line or the neutral power line (return power line) of the premises. The router 110 is configured to communicate over at least one power line. Each power control modules 140 is configured to communicate over at least one power line.

In an example scenario, a user may wish to turn on a light. Once authenticated, the client device 118 can instruct the power control module 140 to activate a switch in order to turn on the light. Similarly, the client device 118 may be used to digitally open a breaker by providing instructions to the power control module 140 to open the breaker. In another example, the client device 118 may be used to digitally reset a breaker or electrical receptacle by providing instructions to the power control module 140.

In an example scenario, the client device 118 is granted authorized access to a switch. For example, the switch can be for a critical system such as an artillery activation, a part of a utility grid, or a breaker panel. The switch can be activated (or opened in the case of a breaker) or deactivated (or closed in the case of a breaker).

It can be appreciated that the power control module 140 can support Internet-Of-Things, causing each device 104 to have communication functionality as well as access control to the devices 104 secured by proof of authority authentication over the blockchain.

Figure 1E:
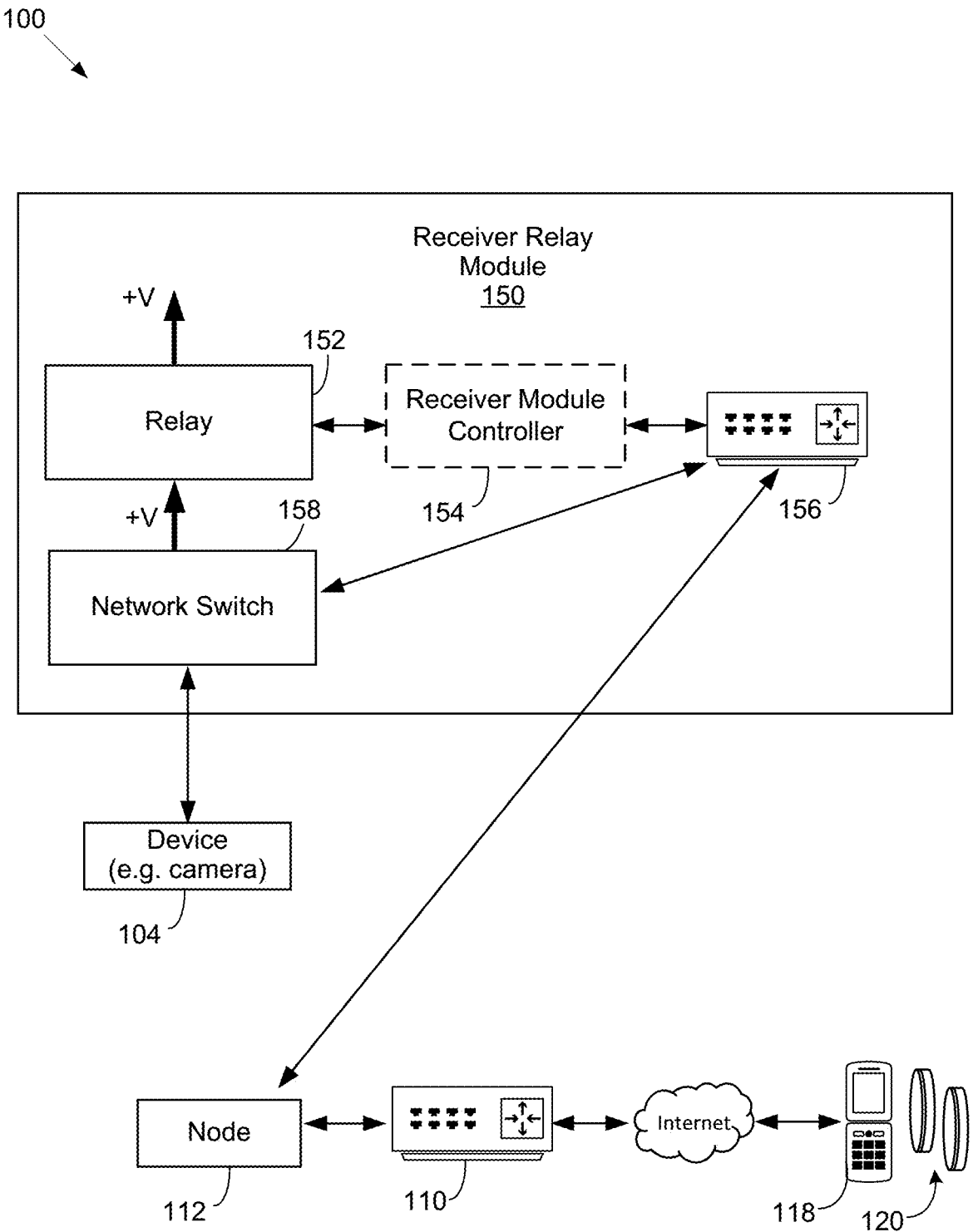
FIG. 1E illustrates an example of a receiver relay module for the access control system and access control method, in accordance with an example embodiment.

FIG. 1E illustrates an example of a receiver relay module 150 for the access control system and access control method, in accordance with an example embodiment. In the example of FIG. 1E, the receiver relay module 150 is used to activate power for access control to the device 104, such as a camera, e.g. baby monitor, Internet Protocol (IP) camera, or security camera.

In an example, the receiver relay module 150 includes a relay 152, optionally a receiver module controller 154, a router 156, and a network switch 1518. The receiver module controller 154 can be a processor, hardware, or a combination of hardware and software. In examples, the receiver module 150 can be in a single package or can be separate components (packages). In an alternate example, the node 112 directly controls the relay 152 and the receiver module controller 154 is not necessarily required.

In examples, the receiver relay module 150 provides an additional layer of security to the access control system 100. In FIG. 1E, the reference +V is used to indicate power supply, which can be portable power, utility power, direct current (DC) or alternating current (AC). Ground is not shown here for clarity. The relay 152 can be used to activate power from the power supply to the network switch 158, which is a hard power activation. Once the power is activated to the network switch 158 by the relay 152, the network switch 158 is powered on and provides of communication connectivity between the device 104 and the local network through the router 156 (and via the node 112 and/or the router 110).

In an example, the network switch 158 is a 2-port network switch which connects one port to the device 104 (e.g. camera) and the other port to the router 156 for access to the local network (and remote access to the client device 118 upon successful authentication by the node 112). In an example, the network switch 158 is a wired network switch. In another example, the network switch 158 is a wireless network switch.

In an example embodiment, the device 104 is a baby monitor, which streams video such that the baby can be observed remotely by parents, care givers, etc. The baby monitor can be secured by the access control system 100. The network switch 158 is powered through the relay 152, and the relay is controlled by the receiver control module 154 (or directly by the node 112). In order to access the video feed, the client device 118 can submit the previously issued one or more token(s) 118 to the node 112, requesting access. Upon receipt (presentation) of the tokens 118, the node 112 authenticates the tokens 112 against the blockchain (by generating a transaction). If successful, the node 112 can communicate the authentication to the receiver module controller 154, which activates the relay 152, which delivers power from the power supply the network switch 158, thereby connecting the baby monitor video feed to the router 156, thus enabling the remote access by the client device 188 to the baby monitor. In an alternate example, the node 112 directly activates the relay 152.

In an example, the node 112 (as defined by the smart contract 130) or the receiver module controller 154 (as instructed by the node 112 and/or the smart contract 130) continues to monitor the time and after a preset time interval expires, de-activates the relay 152, thus disconnecting the network switch 158 and the video feed to the client device 118. The access control of the baby monitor can be repeated, as more monitoring time or sessions are required. Any sensitive equipment (e.g., device 104) that is not desired or needed to be continuously online can operate in the described manner on an on-demand basis, and can be secured for remote access by the receiver relay module 150 in the access control system 100.

In an example, the receiver relay module 150 (or a modified version) can be used as the receiver relay module 128 (FIG. 1B).

Figure 2:
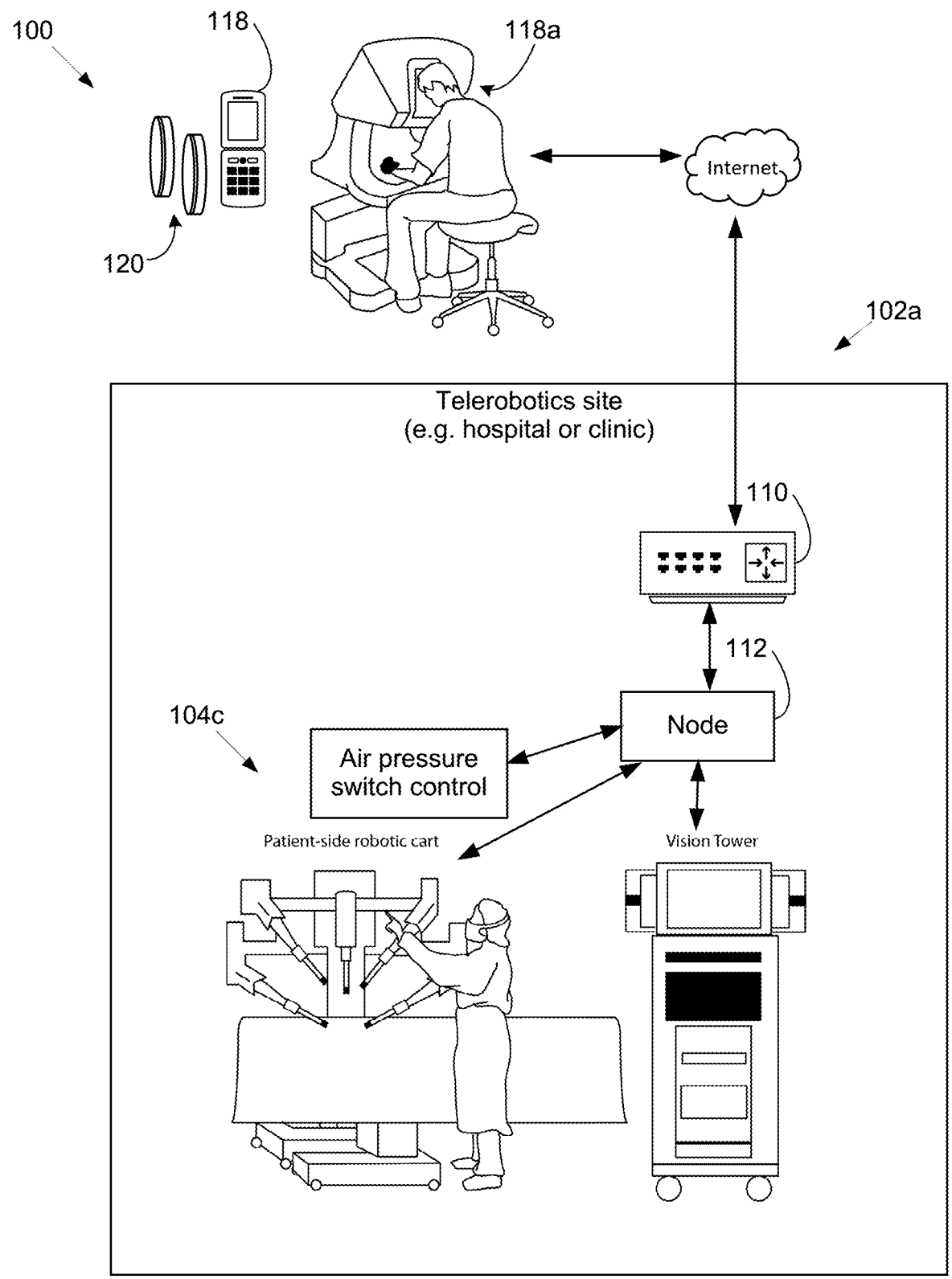
FIG. 2 illustrates another example of the access control system and access control method, for telerobotics, in accordance with an example embodiment.

FIG. 2 illustrates another example of the access control system 100 and access control method, for example when the premises 102 is a telerobotics site 102a such as a hospital or clinic, in accordance with an example embodiment. The access control system 100 is a telerobotics system in the present example. As illustrated in FIG. 1A, the access control method can be applied to a scenario in which a user, such as a health practitioner or doctor, wishes to securely access one or more devices 104, such as one or more robotic devices 104c at the telerobotics site 102a. For example, the user may use the client device 118 in order to access the robotic devices 104c. The may wish to have a convenient and efficient manner of accessing the robotic devices 104c to perform a medical procedure or diagnosis. However, the user does not wish to grant unwanted parties any access to the robotic devices 104c, which could result in a disastrous surgery or a privacy breach.

In an example, a remote control terminal 118a is used to control the robotic devices 104c. For example, the remote control terminal 118a can include one or more user interfaces, including input interfaces (e.g., touchscreens, displays, joy sticks, pedals, etc.) and output interfaces (e.g., touchscreen displays, displays, speakers, LEDs, haptic feedback output, buzzers). In an example, the robotic devices 104c include a patient-side robotic cart (as shown), a vision tower (as shown), and sensors such as cameras, imaging devices, force sensors, feedback sensors. When the user manipulates one of the input interfaces of the remote control terminal, a corresponding action can be performed on at least one of the robotic devices 104c. At least one of the robotic devices 104c may have data (e.g. patient data, sensor data, image data) that can be sent to the remote control terminal 118a. In some examples, the data is received by the remote control terminal 118a and causes haptic feedback on the remote control terminal 118a.

At least one router 110 (one shown here) can define the local network for the telerobotics site 102a, and which communicates with the robotic devices 104c. The router 110 be configured for connection over the Internet.

At least one node 112 (one shown here) can authenticate the tokens 120 by requesting proof of authority authentication using a smart contract 130.

In an example, the client device 118 and the remote control terminal 118a are a same device. In such an example, the remote control terminal 118a can obtain tokens 120 on the blockchain by physical proximity with the token dispenser device 106, by receiving a private key associated with the token 120. In another example the client device 118 and the remote control terminal 118a are separate devices. In such an example, the client device 118 can obtain tokens 129 by physical proximity with the token dispenser device 106. The client device 118 can be securely connected to the remote control terminal 118a, for example using wired connection, short range communication, or other forms of peer-to-peer authentication. Either the client device 118 or the remote control terminal 118a can present the token to the node 112 for the node 112 to request proof of authority authentication. Upon successful proof of authority authentication, the node 112 advises the client device 118 (or the remote control terminal 118a). Once authenticated, the remote control terminal 118a has access to one or more of the robotic devices 104c, or the entire local network of the telerobotics site 102a.

Upon successful authentication by the node 112, the remote control terminal 118a can be used to access the robotic devices 104c, while on the local network or remotely via the Internet. The remote control terminal 118a can be used to access data from or to provide instructions (e.g. controls and commands) to the robotic devices 104c. Upon successful authentication by the node 112, some of the robotic devices 104c can be configured to provide data to the client device 118. Upon successful authentication by the node 112, some of the devices can receive the instructions from remote control terminal 118a, in order to execute controls and commands.

In some examples, the device 104 or robotic device 104c can be an air pressure switch control that creates a negative air pressure in a closed environment, such as an enclosed surgical suite. For example, the device 104 can include a fan, compressor, exhaust, or vacuum, to draw air away from the closed environment to create a negative air pressure within the closed environment. Therefore, contaminants and pathogens are drawn away during operation of the device 104, and any door or window opening will contain the air in the closed environment and draw air into the closed environment from the door or window. In some examples, the air pressure switch control also includes humidity control and temperature control (which affect air pressure). The air pressure switch control can include a control system that maintains a set air pressure or set air pressures. The air pressure switch control can include a smart thermostat, a barometer, a temperature sensor, a pressure sensor, and/or a humidity sensor.

In an example, the token dispenser device 106 is on the premises 102 and is configured to dispense tokens 120. When another second client device 118 presents an improper token, or no token, then that second client device 118 will not be authenticated and will not have access to the local network or any of the devices 104.

In an example, the client device 118 receives a token 120 on the blockchain by communicating over the physical proximity interface of the token dispenser device 106, for example by tapping or by plugging (e.g. directly or via a cable) into the physical proximity interface. The client device 118 can store a private key associated with the token 120 in memory of the client device 118. In an example, the client device 118 sends the private key to the remote control terminal 118a, and the remote control terminal 118a presents the token 120 to the node 112 for proof of authority authentication. Secure access is granted for the remote control terminal 118a by the node 112 to the robotic devices 104c. In another example, the client device 118 presents the token 120 to the node 112 for proof of authority authentication. Secure access is granted for the client device 118 by the node 112 to the robotic devices 104c. The remote control terminal 118a thereafter has access to the robotic devices 104c without the client device 118 in an example, with suitable handoffs. In another example, the remote control terminal 118a continually communicates through the client device 118 to the robotic devices 104c, in which the client device 118 is granted the secure access.

In an example, a token 120 can be used for continuous access for a time period to the robotic device 104c or the local network. For example, the time period is indefinite until access is removed by the node 112 (e.g. as defined by the smart contract 130). In another example, the time period is terminated after a specified session between the robotic devices 104c and the client device 118 or the remote control terminal 118a, for example one surgical procedure or one diagnostic procedure. In such an example, when a second surgical procedure or diagnostic procedure is required, a new token 120 needs to be obtained by way of physical proximity or physical contact with the token dispenser device 106.

In an example, every command from the client device 118 is issued under blockchain protection and hence there is security against hacking.

In an example, after presentation of the token 120 to the node 112, the token 120 is verified by the node 112 by the node 112 requesting proof of authority authentication using a smart contract 130 and a blockchain of a blockchain layer. After the proof of authority authentication is completed, an immutable entry (also referred to as a transaction) is made on the blockchain in the form of a transaction. The entry can be a log of the particular access by the client device 118 to the robotic devices 104c.

In an example, the access control method illustrated in FIG. 2 is continuously and repeatedly performed by the access control system 100, for generation of the tokens 120, sending of one or more of the tokens 120 to the client device 118 through the physical proximity interface of the token dispensing device 106, and providing access by the client device 118 to at least one of the robotic devices 104c upon presentation of a token 120. Other client devices 118 can also retrieve unique tokens 120 through the physical proximity interface of the token dispensing device 106, and access at least one of the robotic devices 104c upon presentation of a token 120.

Figure 3:
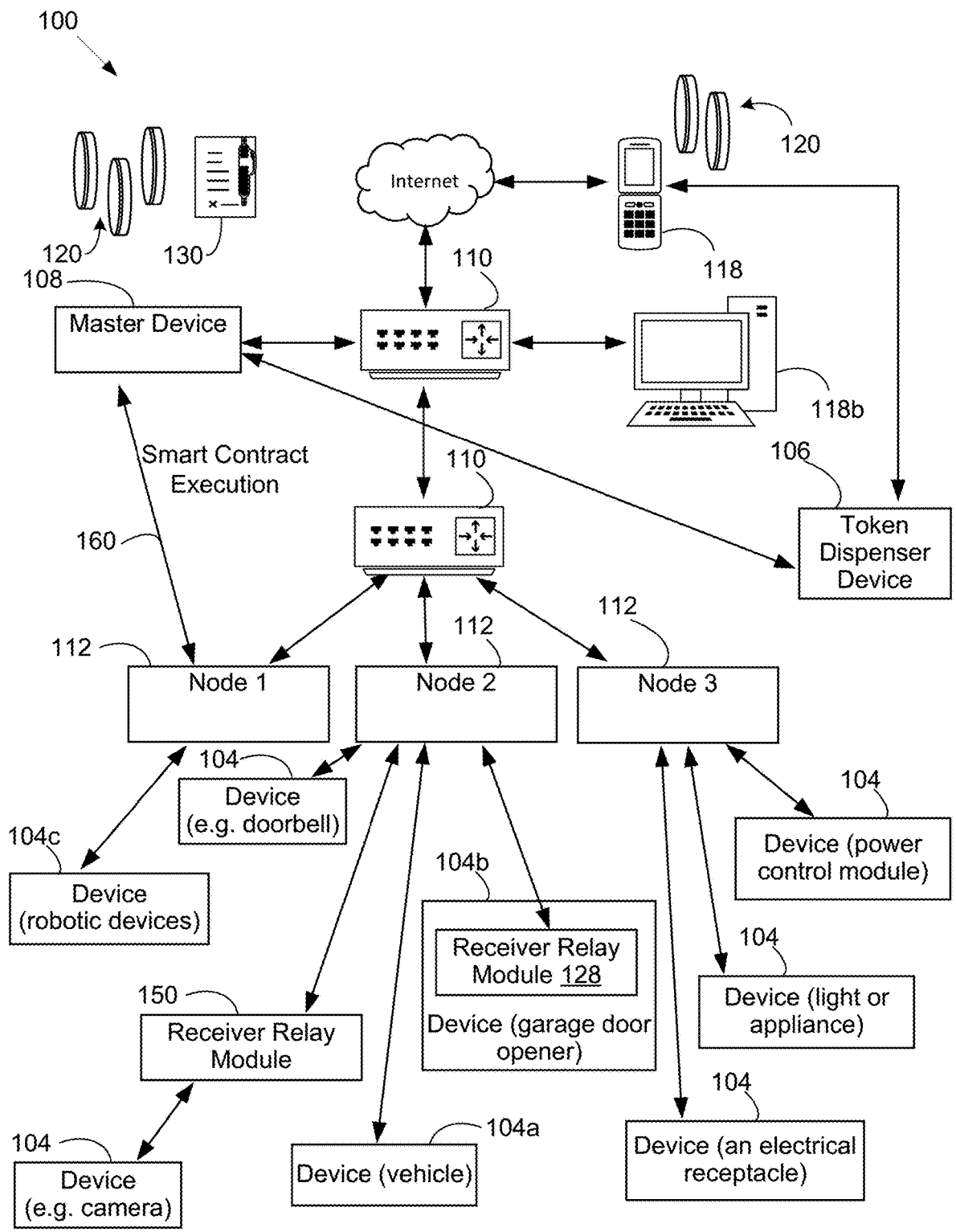
FIG. 3 illustrates a detailed example of the access control system and access control method, in accordance with an example embodiment.

FIG. 3 illustrates a detailed example of the access control system 100 and access control method, in accordance with an example embodiment. In examples, the access control system 100 and access control method of FIG. 3 can be used to implement the access control system 100 and access control method described in relation to FIGS. 1A, 1B, 1C, 1D, 1E and 2. The access control system 100 includes routers 110 (two shown here) which collectively define the local network. The access control system 100 includes at least one master device 108 (one shown) that is configured to generate the tokens 120. The master devices 108 can generate an unlimited amount of tokens 120 to distribute to the rest of the network, or can generate as many tokens as needed 120. The master device 108 can also be referred to as a master node, master authority node, or a master of ceremonies. In an example, the tokens 120 are currency tokens or blockchain tokens such as Ethereum tokens, e.g. Ethereum Request for Comment 20 (ERC-20) tokens. In an example, the master device 108 is configured to generate a blockchain with the token. In an example, the master device 108 generates one or more smart contracts 130 that are used to authenticate the tokens 120, for example using proof of authority authentication by the master device 108. In an example, the master device 108 executes the smart contracts 130. In an example, the master device 108 stores one or more of the blockchains in a blockchain layer. The blockchains are used to perform the proof of authority authentication on the tokens 120. The master device 108 can generate a token 120 that is a root token, and the root token can be used to generate the first block in one of the blockchains.

In an example, upon successful proof of authority authentication, the master device 108 adds a block to the blockchain at issue. The added block is an immutable entry on the blockchain and indicates that the token 120 was authenticated. In some examples, the block contains other data such as time of access, time period, an identity of the client device 118 and/or the device 104.

In some examples, the router 110 is wiredly connected to the master device 108. In another example, the token dispenser device 106 is wiredly connected to the master device 108 (or temporarily connected or in physical proximity through the physical proximity interface to the master device 108 in order to obtain a number of tokens 120). In an example, the client device 118 obtains the tokens 120 on the blockchain from the token dispenser device 106 by receiving a private key.

In an example, the client device 118 is a mobile communication device and accesses the local network through the Internet. In an example, the client device 118 is on the local network when requesting access to the devices 104, and can be a desktop computer 118b as shown in FIG. 3.

At least one node 112 (e.g., three shown in FIG. 3) can authenticate the tokens 120 by requesting proof of authority authentication by the master device 108. The node 112 can also be referred to as an authorization service provider, a light node, a network node, a gateway, a commander, a validator, or an authenticator. In an example, the node 112 only needs to receive the token 120 in order to grant authorized access to the client device 118, and additional identification or credentials are not required from the client device 118.

Upon successful authentication by the node 112, the client device 118 can be authorized to access at least one of the devices 104, while on the local network or remotely via the Internet. The client device 118 can be used to access data from or to provide instructions to (e.g. controls and commands) the device 104. Upon successful authentication by the node 112, the device 104 can be authorized to provide data to the client device 118.

A user may wish to grant access to the devices 104 in a secure, efficient, and convenient manner. When another second client device 118 presents an improper token, or no token, then that second client device 118 will not be authenticated by the node 112 and will not have access to the local network or any of the devices 104 on the local network. In particular, the second client device 118 that does not have physical proximity or physical contact with the token dispenser device 106 will not be able to receive any tokens 120.

In an example, the node 112 is an intermediary to the device 104 and is configured to pass any authorized access (e.g., instructions or data) with (to or from) the device 104. The node 112 can be considered a router or communications relay in such an example. In another example, after the node 112 authenticates the client device 118, the node 112 instructs the device 104 that all communications from the client device 118 are authorized (e.g. within the authorized time period) and does not need to act as an intermediary. For example, the node 112 sends to the device 104 a credential or a unique identifier of the client device 118, such as a media access control (MAC) address or a International Mobile Equipment Identity (IMEI) number. In another example, after the node 112 authenticates the client device 118, the node 112 advises the router 110 or an authentication server (e.g., an authentication, authorization, and accounting (AAA) server or Radius server) to authorize the client device 118 to have access to any device 104 on the local network. In another example, the node 112 instructs both the device 104 and the router 110 (and/or the authentication server) that the client device 118 has authorized access. In examples, the amount of access granted can be single access, discrete number of accesses, continuous access, trigger based, time limited access, and other types and times of access.

In an example, the client device 118 receives a token 120 on the blockchain by communicating over the physical proximity interface of the token dispenser device 106, for example by tapping or by plugging (e.g. directly or via a cable) into the physical proximity interface. The client device 118 can receive and store a private key associated with the token 120 in memory of the client device 118. At the same time, in some examples, the client device 118 can also receive a public key associated with the private key. At the same time, in some examples, the client device 118 can also receive a passcode associated with the private key. In an example, at a later time the client device 118 may wish to access the devices 104 (either via the Internet or while on the local network). The client device 118 presents the token 120 to the node 112 for proof of authority authentication. Secure access is granted by the node 112 to the device 104.

Conveniently, in an example, the user of the client device 118 can physically contact (plug into or tap) the client device 118 to the token dispenser device 106 whenever tokens 120 are desired. The tokens 120 can be presented at a later time for authentication of the client device 118. Whenever the user requires additional tokens 120, the user of the client device 118 can physically contact or tap the client device 118 to the token dispenser device 106 to obtain more tokens 120. In an example, no identification or credentials are required to obtain tokens 120. Rather, in such an example, the close proximity and physical proximity interface between the client device 118 and the token dispenser device 106 are used as the primary security barrier for obtaining new tokens 120. As well, the physical proximity interface of the token dispenser device 106 for receiving tokens 120 from the master device 108 is part of the primary security barrier for obtaining new tokens 120. In an example, the tokens 120 are only generated on the local network and are transmitted and dispensed through only physical proximity interfaces and wired connections, therefore increasing security by having all handling of the tokens 120 being done through physical proximity interfaces and wired connections. In an example, the tokens 120 cannot be dispensed by the token dispenser device 106 remotely or over long range wireless communications.

In an example, a token 120 can be used for single access to the device 104 or the local network. The token 120, after being authenticated by way of proof of authority authentication, is allowed single access to the device 104. For example, the device 104 is authorized to send data to the client device 118. For example, the device 104 is authorized to receive instructions (e.g. commands or controls) from the client device 118. In such an example, more tokens 120 are acquired from the token dispenser device 106 through the physical proximity interface (e.g. tapping or plugging in).

In an example, a token 120 can be used for continuous access for a time period to the device 104 or the local network. The token 120, after being authenticated by way of proof of authority authentication, allows continuous access to the device 104 for the time period. In an example, the time period is indefinite until access is removed from the local network. Other examples can have other time periods or triggers.

In an example, after presentation of the token 120 to the node 112, the token 120 is verified by the master device 108 by way of proof of authority authentication using a smart contract 130 and a blockchain of a blockchain layer. After the proof of authority authentication is completed, an immutable entry is made by the master device 108 on the blockchain in the form of a transaction.

In an example, the continuous access is performed by way of the client device 118 sending a credential or a unique identifier to the device 104 (or to the node 112 when the node 112 is the intermediary in charge of maintaining authorized access). The device 104 or the node 112 can thereafter identify the authorized communications from the client device 118. In some examples, the unique identifier of the client device 118 can be the media access control (MAC) address or the International Mobile Equipment Identity (IMEI) number. In another example, the continuous access is performed by way of single sign on (SSO), symmetric encryption, asymmetric encryption, or other secure protocols. In such examples, the token 120 or the private key can be used as the key (symmetric key or asymmetric key). In some examples, another key (symmetric key or asymmetric key) can be exchanged or generated.

In an example, the device 104 is a computer on the local network, such as a personal computer, server, or mobile device. In an example, upon successful authentication by the node 112, the device 104 authorizes the client device 118 by way of a secure session such as a peer-to-peer session or a virtual private network (VPN) session.

In some examples, the implementation of the single access versus the continuous access can be based on the particular application or implementation, or can be defined by the smart contract 130.

In an example, the access control method is continuously and repeatedly performed by the access control system 100, for generation of the tokens 120, the token dispenser device 106 sending one or more tokens 120 to the client device 118, and the node 112 providing access by the client device 118 to at least one of the devices 104 upon presentation of a token 120.

In examples, the access control method can be performed in parallel with other users and their respective client device 118, in order to provide secure and targeted access by a plurality of the client devices 118 to one, some or all of the devices 104.

Figure 4:
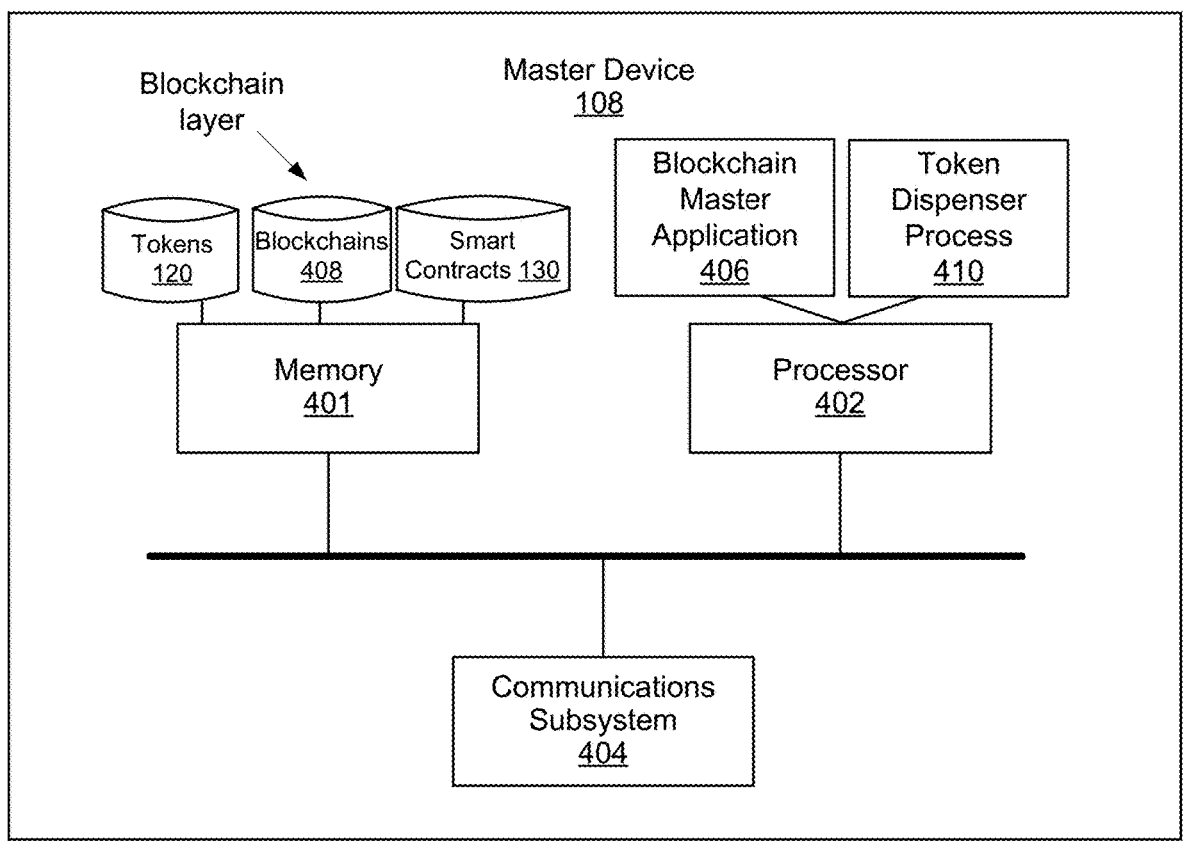
FIG. 4 illustrates a block diagram of a master device for use in the access control system of FIG. 3, according to an example embodiment.

FIG. 4 illustrates a detailed block diagram of the master device 108, according to an example embodiment. The example master device 108 includes a memory 401, a processor 402, and a communications subsystem 404. A communication connection is implemented between the memory 401, the processor 402, and the communications subsystem 404, for example using a bus. The processor 402 is configured to perform, when the program stored in the memory 401 is executed by the processor 402, steps of the access control method as detailed in FIG. 3.

The memory 401 can be a read-only memory (Read Only Memory, ROM), a static storage device, a dynamic storage device, or a random access memory (Random Access Memory, RAM). The memory 401 may store a program. The memory 401 can be a non-transitory memory. The memory 401 can be external or removable in some examples. In an example, the memory 401 includes the tokens 120, the blockchains 408, and the smart contracts 130. The master device 108 stores a private blockchain (also called private blockchain layer). In another example, the master device 108 and other such master device(s) 108 collectively store the private blockchain. In some examples, the tokens 120, the blockchains 408, and the smart contracts 130 are stored in a plurality of the master device 108. When there is more than one master device 108, the tokens 120, the blockchains 408, and the smart contracts 130 may have an identical copy which is stored amongst all of the master devices 108.

The processor 402 can be a general central processing unit (CPU), a microprocessor, an application-specific integrated circuit (ASIC), a graphics processing unit (GPU), or one or more integrated circuits. The processor 402 may be an integrated circuit chip with a signal processing capability. In an implementation process, steps of the access control method as described herein can be performed by an integrated logical circuit in a form of hardware or by an instruction in a form of software in the processor 402. In addition, the processor 402 can be a general purpose processor, a digital signal processor (DSP), an ASIC, a field programmable gate array (FPGA) or another programmable logic device, a discrete gate or a transistor logic device, or a discrete hardware assembly. The processor 402 can implement or execute the methods, steps, and logical block diagrams that are described in example embodiments. The general purpose processor can be a microprocessor, or the processor may be any conventional processor or the like. The steps of the access control method disclosed with reference to the example embodiments may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 401. The processor 402 reads information from the memory 401, and completes, by using hardware in the processor 402, the steps of the access control method.

In an example, the processor 402 executes a blockchain master application 406 to perform the functions of the master device 108. In an example, the blockchain master application 406 performs the proof of authority authentication and also generates a new transaction and updates the blockchain 408. In an example, the blockchain master application 406 executes the smart contracts 130. In an example, the processor 402 executes a token dispenser process 410 and sends a corresponding private key to the token dispenser device 106 for each token 120.

The master device 108 can create a blockchain by first creating a genesis block (first block) of the blockchain. For example, the master device 108 creates a private key, which can be randomly generated or as a solution to a mathematical problem. The master device 108 generates a token 120 from the private key, for example by hashing the private key. The master device 108 creates a blank database along with a master account that contains a large or inexhaustible amount of such tokens 120 (e.g., very large number of tokens 120). The master account can initially include a first transaction that has no "from" account and the newly created master account as "to" account as a part of the genesis block (first block). The "From" account in any transaction can be blank only in the genesis block in a proof-of-authority blockchain. In some examples, there is no creation of new tokens 120 subsequent to the genesis block as a result of mining, in contrast to other typical blockchains such as bitcoin that employ proof-of-work. In such an example, all subsequent token transfers that occur are a result of tokens being transferred from the master account in some form or the other.

A user (e.g., individual associated with the local network or the premises 102) may wish to reset the blockchain. For example, a token 120 or the blockchain may be compromised. In such an example, the reset can be performed by the user having physical access to the master device 108, for example, by inputting through a user input device, pressing a special key sequence on the terminal of the master device 108, or pressing a special button on the master device 108. In response to receiving the reset instruction, the master device 108 deletes the blockchain 408 at issue. In another example, the master device 108 can be configured to perform a master reset and delete all of the blockchains 408. The tokens 120 are no longer valid. Accordingly, any existing tokens 120 can no longer validated on the blockchain 408. In some examples, the token dispenser device 106 is also reset to discard old tokens and be initialized with new tokens after physically connecting to the master device 108. After the reset, the master device 108 can generate new tokens 120 and generate new blockchains. An example scenario is when the premises 102 is a residence and the residence is sold to a new owner. The owner may wish to perform the master reset and delete all of the blockchains. The infrastructure of the master device 108 and the nodes 112 can remain so that the new owner can create new tokens 120 for secure access to the premises 102.

An example embodiment is a method, including receiving, by the master device 108, an instruction to reset a blockchain; and resetting the blockchain layer. In an example, the method further includes deleting the blockchain. In an example, the deleting the blockchain includes deleting the blockchain from a memory of the master device 108. In an example of the method, the method includes sending a communication from the master device to at least one other master device or node to delete the blockchain.

In an example of the method, the master device 108 generates a (new) genesis block of a new blockchain, which can be performed after receiving the instruction or after resetting the blockchain. In an example, another master device or node generates the genesis block.

The communications subsystem 404 implements communication between the master device 108 and the router 110, and other devices on the local network. In some examples, the communications subsystem can include a transceiver apparatus (including a transceiver). For example, the tokens 120, the blockchains 408 and the smart contracts 130 can be communicated over the communications subsystem 404. Updates to the blockchains 408 may be received over the communications subsystem 404, for example from one or more of the nodes 112. In some examples, the communications subsystem 404 implements only wired communication with the router 110 for increased security, e.g. management and communication of the tokens 120, the blockchains 408 and the smart contracts 130. In an example, the communications subsystem includes a physical proximity interface (not shown here), which can include a physical contact interface (not shown here), to dispense the tokens 120 to the token dispenser device 106.

In some example, the master device 108 is blocked from accessing the Internet or any device beyond the local network. In an example, the master device 108 can be configured to be blocked from the Internet. In another example, the router 110 or a gateway (not shown here) is configured to block the master device 108 to and/or from accessing the Internet. By blocking the master device 108 from accessing the Internet, the proof of authority authentication can be considered secure and can increase cybersecurity from external attacks.

It should be noted that, although the memory 401, the processor 402, and the communications subsystem 404 are shown in the master device 108 in FIG. 4, in a specific example implementation, a person skilled in the art should understand that the master device 108 may further include other components that are necessary for implementing execution of the access control method. In addition, based on specific needs, a person skilled in the art should understand that the master device 108 may further include hardware components that implement other additional functions. In addition, a person skilled in the art should understand that the master device 108 may include only a component required for implementing the embodiments, without a need to include all the components shown in FIG. 4.

Figure 5:
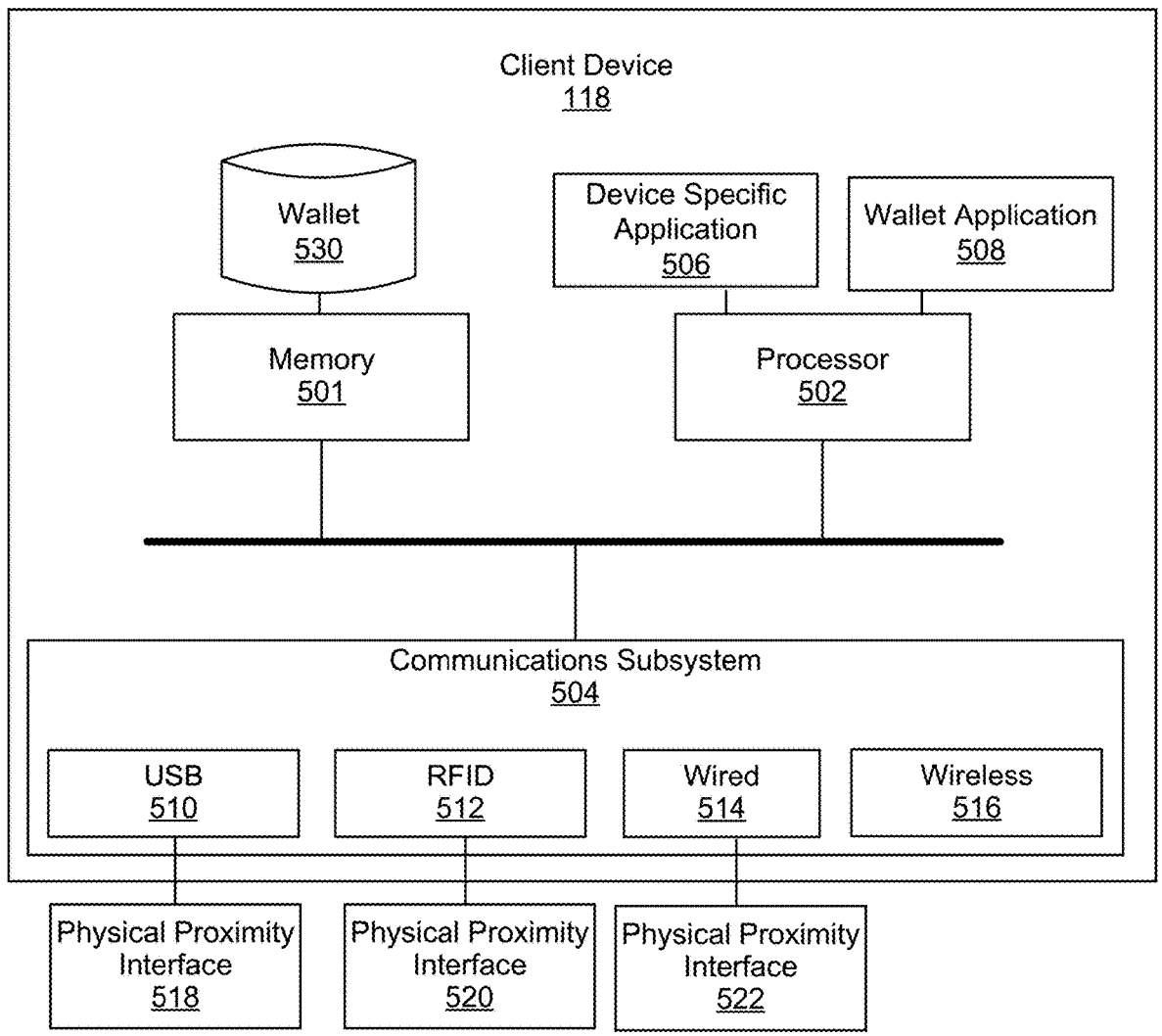
FIG. 5 illustrates a block diagram of a client device for use in the access control system of FIG. 3, according to an example embodiment.

FIG. 5 illustrates a detailed block diagram of the client device 118, according to an example embodiment. The client device 118 can include a memory 501 and a processor 502, which in examples can be similar to those described in relation to the master device 108 (FIG. 4). The memory can include a wallet 530 that tracks the tokens 120 owned by the client device 118. The processor 502 can execute a wallet application 508. The processor 502 can execute a device specific application 506.

In an example, the client device 118 includes a communications subsystem 504. The communications subsystem 504 can include a USB interface 510, an RFID interface 512, a wired communication interface 514 (e.g. Ethernet), and a wireless interface 516. The wireless interface 516 can support Wifi, Bluetooth®, 4G, 5G, etc. The USB interface 510 can include a physical proximity interface 518, such as a plug or port. The USB interface 510 can be USB-A, USB-B, USB-C, and other versions, etc. The RFID interface 512 can include a physical proximity interface 520, which can include a surface that can be used for tapping. The wired communication interface 514 can include a physical proximity interface 522, such as a plug or port.

The wallet 530 stores one or more wallet private keys, one or more wallet public keys, and their associated account addresses. Each wallet private key corresponds to a wallet public key. The wallet private keys are kept secret with the client device 118. The client device 118 can access and transfer the tokens 120 by using the wallet private key in the form of transactions on the blockchain. The wallet 530 includes the blockchain address of the tokens 120 on the blockchain layer that are owned by the client device 118. The client device 118 can have other user passwords and security features to protect the wallet private keys, which are understood in the art and not described here.

In some alternate examples, the wallet 530 is stored externally to the client device 118, such as in a USB drive or on a cloud server (not shown here).

The tokens 120 can be retrieved in response to engaging any one of the physical proximity interfaces, e.g. physical proximity interface 518, 520, 522, to the token dispenser device 106 e.g. by tapping or by plugging in to the token dispenser device 106. In an example, the token 120 is automatically received from the token dispenser device 106 in response engaging the physical proximity interface. In some examples, the wallet application 508 can be used to manage permissions and settings as to how tokens 120 are to be retrieved when engaging the physical proximity interface, e.g. whether a user prompt is required. The wallet application 508 can be used to select how many tokens 120 are to be retrieved when the engaging the physical proximity interface, or to maintain a particular number of tokens 120 so as not to run out of tokens 120, etc. In an example, the token 120 can be retrieved by the client device 118 by engaging the physical proximity interface without providing additional identifiers or credentials to the token dispenser device 106.

In an example, the wallet application 508 is used by the client device 118 to present a token 120 to the node 112. In an example, the client device 118 presents the token 120 by using a wallet private key and starting a transaction on the blockchain.

Once authenticated, the device specific application 506 of the client device 118 can be used to access the device 104 of interest, for example by sending instructions and/or by receiving data. For example, for the garage door opener 104*b* (FIG. 1B), the device specific application 506 can be a garage door opener application executed on the client device 118 for accessing the garage door opener 104*b*.

Figure 6:
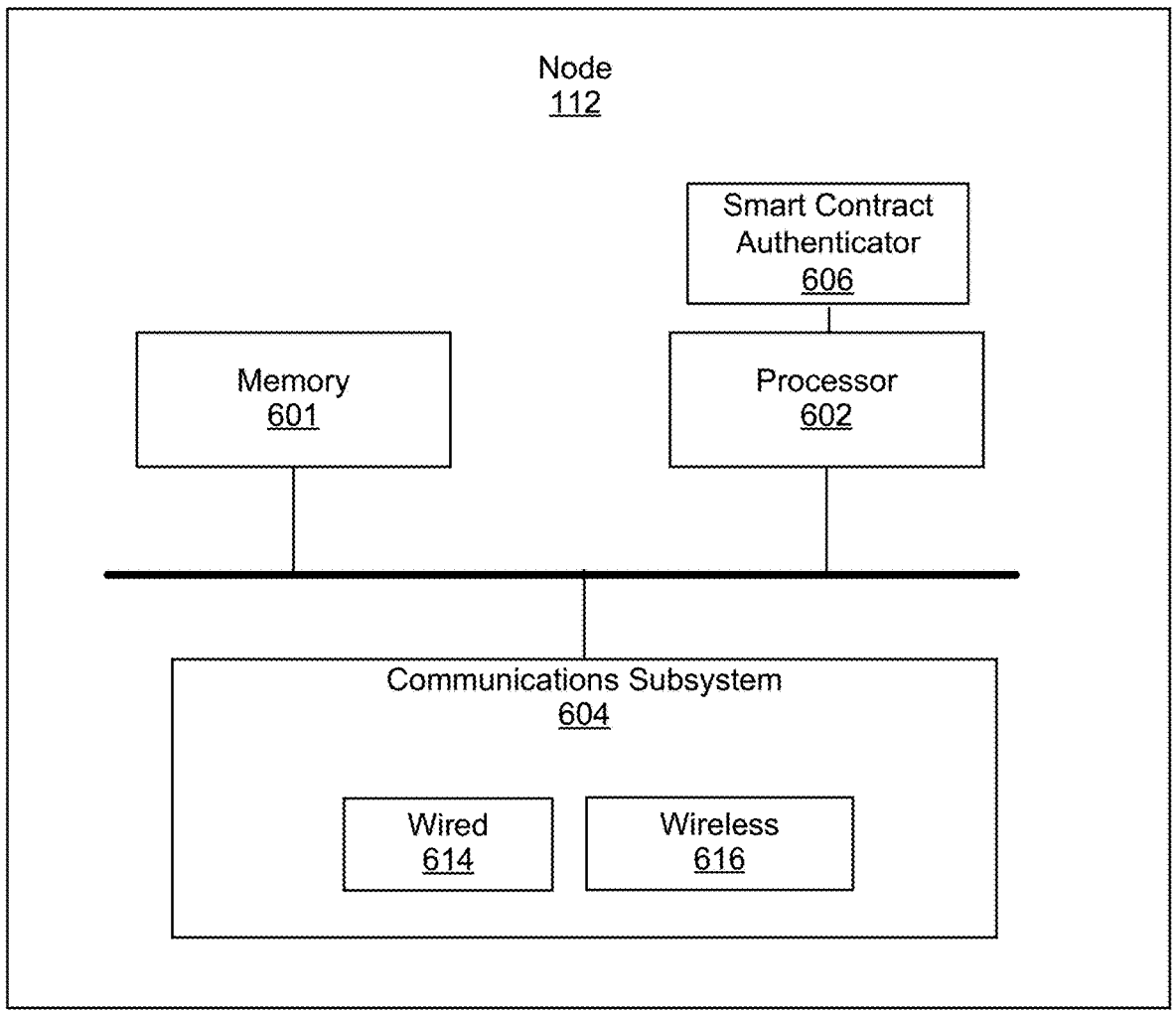
FIG. 6 illustrates a block diagram of a node for use in the access control system of FIG. 3, according to an example embodiment.

FIG. 6 illustrates a block diagram of the node 112, according to an example embodiment. In an example, the node 112 is a trusted part for the blockchains 408 and is on the local network, for example on the local wired network. Accordingly, the node 112 can be configured to request proof of authority authentication from the master device 108 in a trusted manner. In an example, any one of the nodes 112 (e.g. three nodes 112 as in FIG. 3) can be the gateway to which a token 120 is presented, after which the node 112 presents the token to the master device 108 for proof of authority authentication.

The node 112 can include a memory 601, a processor 602, and a communications subsystem 604 which in examples can be similar to those described in relation to the master device 108 (FIG. 4). The memory 601 can store the smart contract 130.

When the client device 118 needs to access the resources present on the local network, the client device 118 communicates with the node 112. The node 112 sends a public address for the smart contract 130 to the client device 118. The client device 118 creates a transaction for the smart contract 130 with an account owned by the client device 118 (that was previously received from the token dispenser device 106 as "from" account and the smart contract 130 as "to" account), with the required number of tokens 120, and sends the transaction to the node 112. Along with this transaction, the client device 118 can send the identification of the particular access or command to be executed that requires the access to the local network (or a device 104 or resource on the local network). The node 112 sends the transaction to the master device 108. The master device 108 performs proof of authority authentication on the smart contract 130. If the transaction is executed successfully, meaning that the transaction was valid, the node 112 proceeds to execute the command accompanying the transaction and returns the result to the client device 118.

In an example, a software development kit (SDK) can be provided which allows the node 112 to extend the capability of the node 112 to control various devices as required by the client device 118. The SDK provides an application programming interface (API) which allows the client device 118 (or any third party) to use the secure authorization services provided by the node 112 and create plug-ins that enable control of devices that requires various protocols such as Modbus, Bacnet, etc.

As understood in the art, the smart contract 130 can include both the criteria (e.g. presentation of the token 120 and start of a transaction on the blockchain), as well as the actions or authorizations to be performed by the node 112 (and other devices) upon satisfaction of the criteria (e.g. access to the local network).

The processor 602 can execute a smart contract authenticator 606. The smart contract authenticator 606 receives the received token 120 and requests the master device 108 to authenticate the token 120 using a smart contract 130 and a blockchain 408. In an example, only one node 112 needs to request the proof of authority authentication because the master device 108 is a proof-of-authority master node.

The smart contract 130 can also identify what is to be performed by the node 112 upon successful proof of authority authentication. For example, the smart contract 130 can define which particular device 104 is permitted to be accessed. In another example, the smart contract 130 can define that the entire local network is permitted to be accessed. In an example, the smart contract 130 can define the time period (or termination trigger) as to how long the device 118 is authenticated. In an example, the smart contract 130 can define what additional information is to be logged on the blockchain 408.

In some examples, access to the device 104 or the local network requires more than one token 120. The smart contract authenticator 606 can receive the required number of tokens 120 being presented by the client device 118, and can request authentication of the required number of tokens 120 in order to access the device 104 or the local network.

Figure 7:
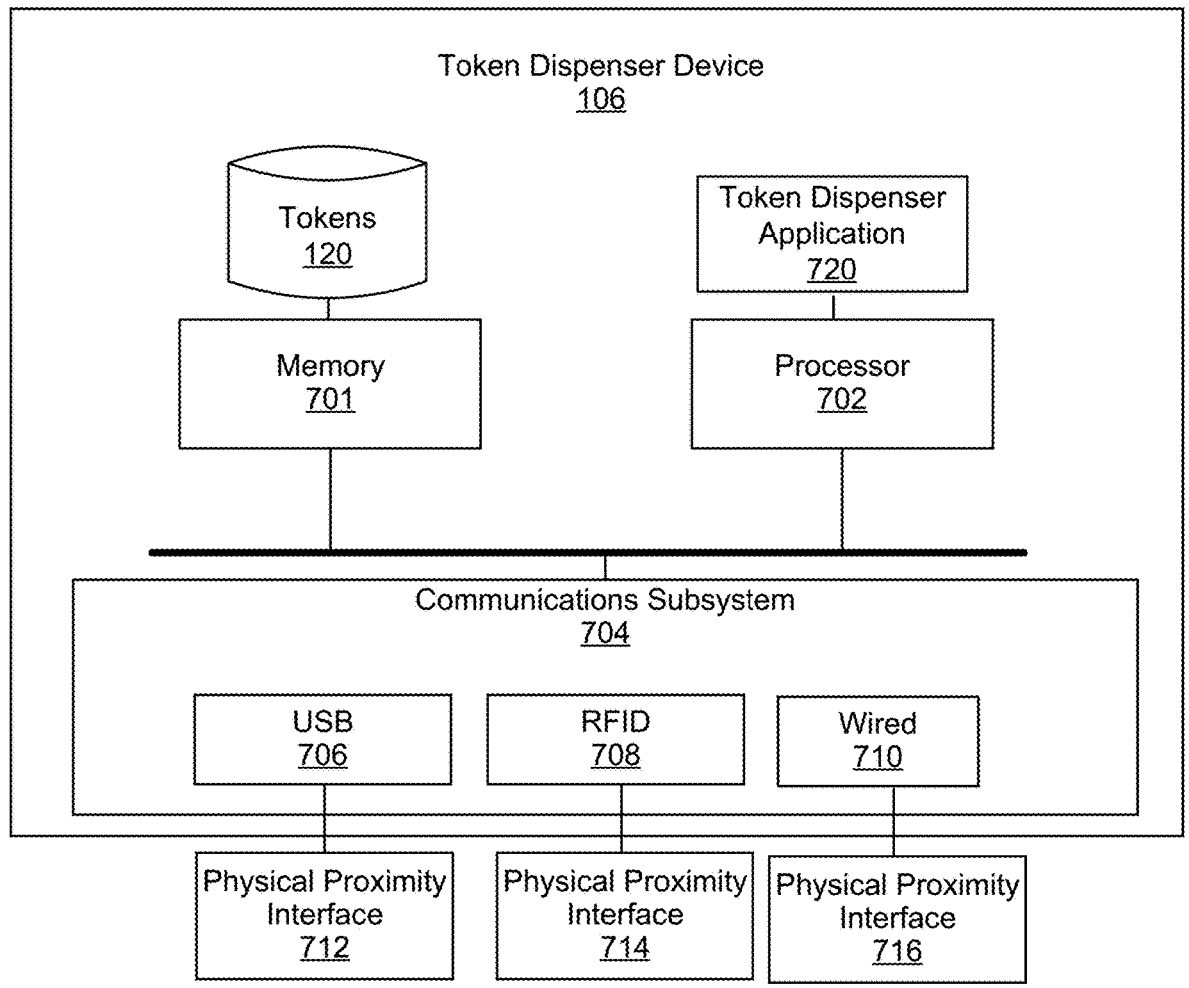
FIG. 7 illustrates a block diagram of a token dispenser device for use in the access control system of FIG. 3, according to an example embodiment.

FIG. 7 illustrates a block diagram of the token dispenser device 106, according to an example embodiment. The token dispenser device 106 can include a memory 701 and a processor 702, which in examples can be similar to those described in relation to the master device 108 (FIG. 4). In an example, the memory 701 stores private keys associated with the tokens 120 to be dispensed to the client device 118. In an example, the processor 702 executes a token dispenser application 720 for dispensing the tokens 120 to the client devices 118. In an example, once a token 120 is dispensed, that token 120 cannot be re-used or given to another client device 118. In an example, the private keys associated with the tokens 120 are received from the master device 108 over the physical proximity interface 716 of the wired communication interface 710.

The token dispenser device 106, by virtue of close physical proximity or local network connection to the master device 108, can be configured to dispense tokens 120 in accordance with example embodiments. For example, the token dispenser device 106 can interact with the token dispenser process 410 running on the master device 108 to dispense tokens 120, in response to requests arriving only from the physical proximity interface of the token dispenser device 106. The token dispenser device 106 requests that token transfer process be performed by the master device 108 to allocate one or more accounts (can be a large number of accounts) to the token dispenser device 106, with some fixed amount of tokens 120 in each account. For example, the master device 108 can create a master account at the genesis block, which can hold a very large number of tokens. For example, the master device 108 can then create transactions on the blockchain with the master account as "from" account and each newly created account as "to" account along with the value to be transferred from the master account. The master device 108 then transfers the private keys for all the newly created accounts to the token dispenser device 106.

Thus, now the token dispenser device 106 possesses a large number of accounts with private keys that represents "value balance" on the blockchain. The token dispenser device 106 is now ready to dispense the tokens 150 to the client devices 118, by transferring corresponding private keys to particular requesting client devices 118.

In an example, the token dispenser 106 only responds to requests arriving from the physical proximity interfaces, which require physical proximity and, in some examples, physical contact. Thus, physical proximity to the token dispenser 106 establishes "proof-of-identity" without requiring any elaborate mechanisms, identifications, or credentials. This is analogous to having physical access to a live terminal of a high value server with an administrator user account. No further proof-of-identity is required. A typical process of challenge-response pass-phrase (entering a value on the terminal or user interface of the token dispenser device 106) can be implemented to further secure the interface, as an optional additional security feature.

In an example, when dispensing a token 120, the token dispenser 106 transfers the private keys for the accounts that the token dispenser 106 received from the token dispenser process 410 in the master device 108. Thus the client device 118 now "owns" the tokens 120 held on the blockchain corresponding to the private key received from the token dispenser device 106 and are kept in the wallet on the client device 118. These tokens 120 can then subsequently be used to securely access the devices 104 on the local network.

The token dispenser device 106, by virtue of connecting to the master device 108 through the local network subsequently eliminates further requirements of identity from the client devices 118 without compromising security.

The token dispenser device 106, when connected to a client device 118, can transfer the private key to one of accounts that token dispenser device 106 possesses. This is the way "tokens" are dispensed to the client devices 118.

In an example, the token dispenser device 106 includes a communications subsystem 704. The communications subsystem 704 can include a USB interface 706, an RFID interface 708, and a wired communication interface 710 (e.g. Ethernet). The USB interface 706 can include a physical proximity interface 712, such as a plug or port. The RFID interface 708 can include a physical proximity interface 714. The wired communication interface 710 can include a physical proximity interface 716, such as a plug or port.

The tokens 120 can be dispensed in response to the client device 118 engaging any one of the physical proximity interfaces, e.g. physical proximity interface 712, 714, 716, e.g. by the client device 118 tapping or by plugging in. In an example, the token dispenser application 720 automatically dispenses the token 120 in response to the client device 118 engaging the physical proximity interface. In some examples, the token dispenser application 720 can receive, over the physical proximity interface, a request which details how tokens 120 are to be retrieved when engaging the physical proximity interface, e.g. whether a user prompt is required. In some examples, the token dispenser application 720 can receive, over the physical proximity interface, a request as to how many tokens 120 are to be dispensed at that time. In an example, the token 120 can be dispensed to by the client device 118 by the client device 118 engaging the physical proximity interface without receiving additional identifiers or credentials from the client device 118.

In an example, the token dispenser device 106 receives the tokens 120 from the master device 108 over one of the physical proximity interfaces, for example by tapping or plugging in.

Figure 8A:
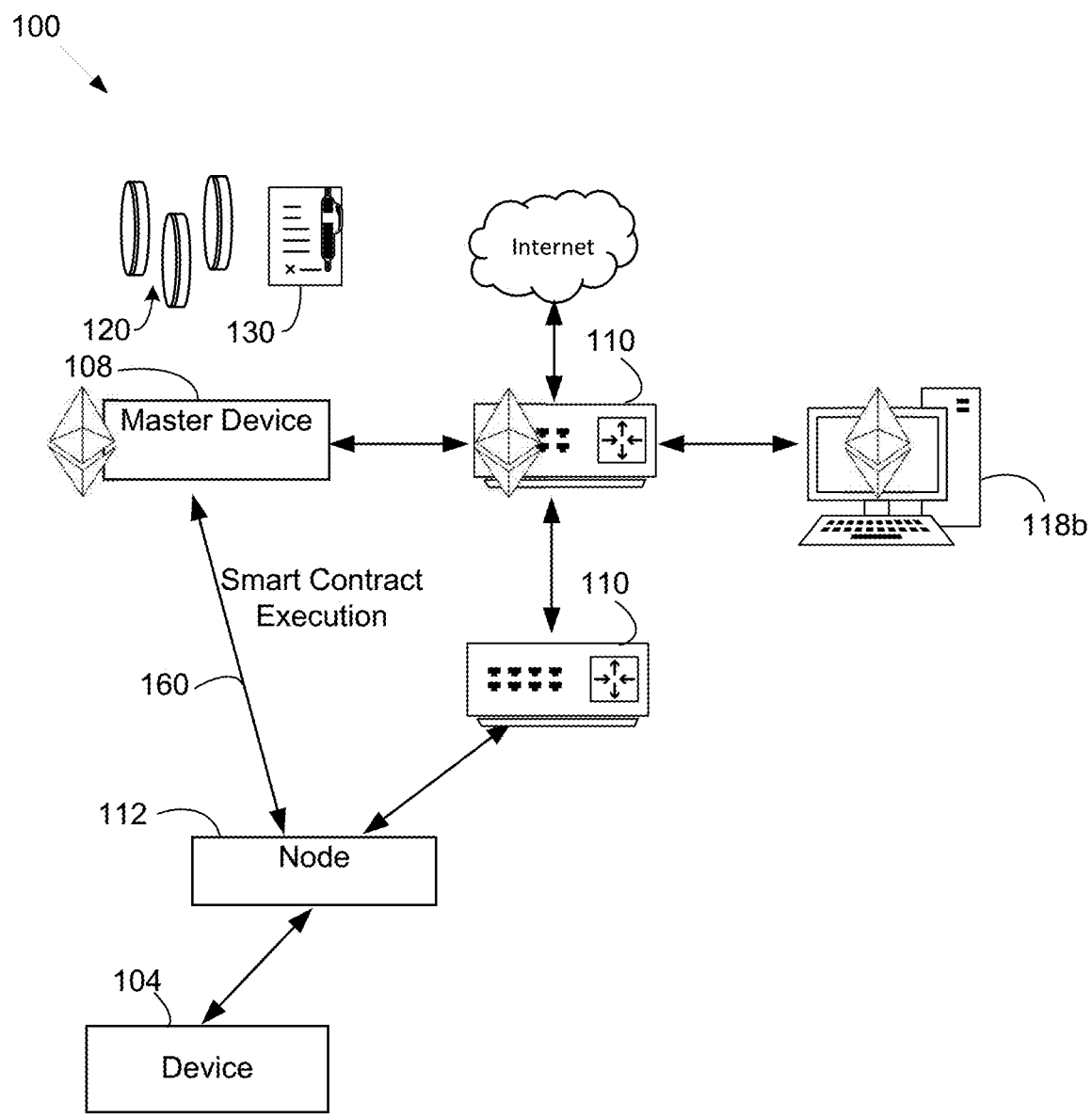
FIG. 8A illustrates an example operation of the access control system and access control method of FIG. 3, in accordance with an example embodiment.

FIGS. 8A, 8B, 8C and 8D illustrate example operations of the access control system 100 and access control method, in accordance with an example embodiment. Blockchain protection is illustrated by way of Ethereum symbols (e.g. diamonds). FIG. 8A illustrates the access control system 100 securing the local network with blockchain protection, in accordance with an example embodiment. The client device can be a desktop computer 118b that is on the local network, and the desktop computer 118b is secured with blockchain protection. For example, the desktop computer 118b can obtain tokens 120 from the token dispenser device 106 (FIG. 3).

The desktop computer 118b can present the tokens 120 to the node 112 for proof of authority authentication in order to access at least one of the devices 104. In an example, the client device 118 presents the token 120 by using a private key and starting a transaction on the blockchain. At communication 160, the node 112 presents the token 120 to the master device 108 for the master device to perform proof of authority authentication.

Figure 8B:
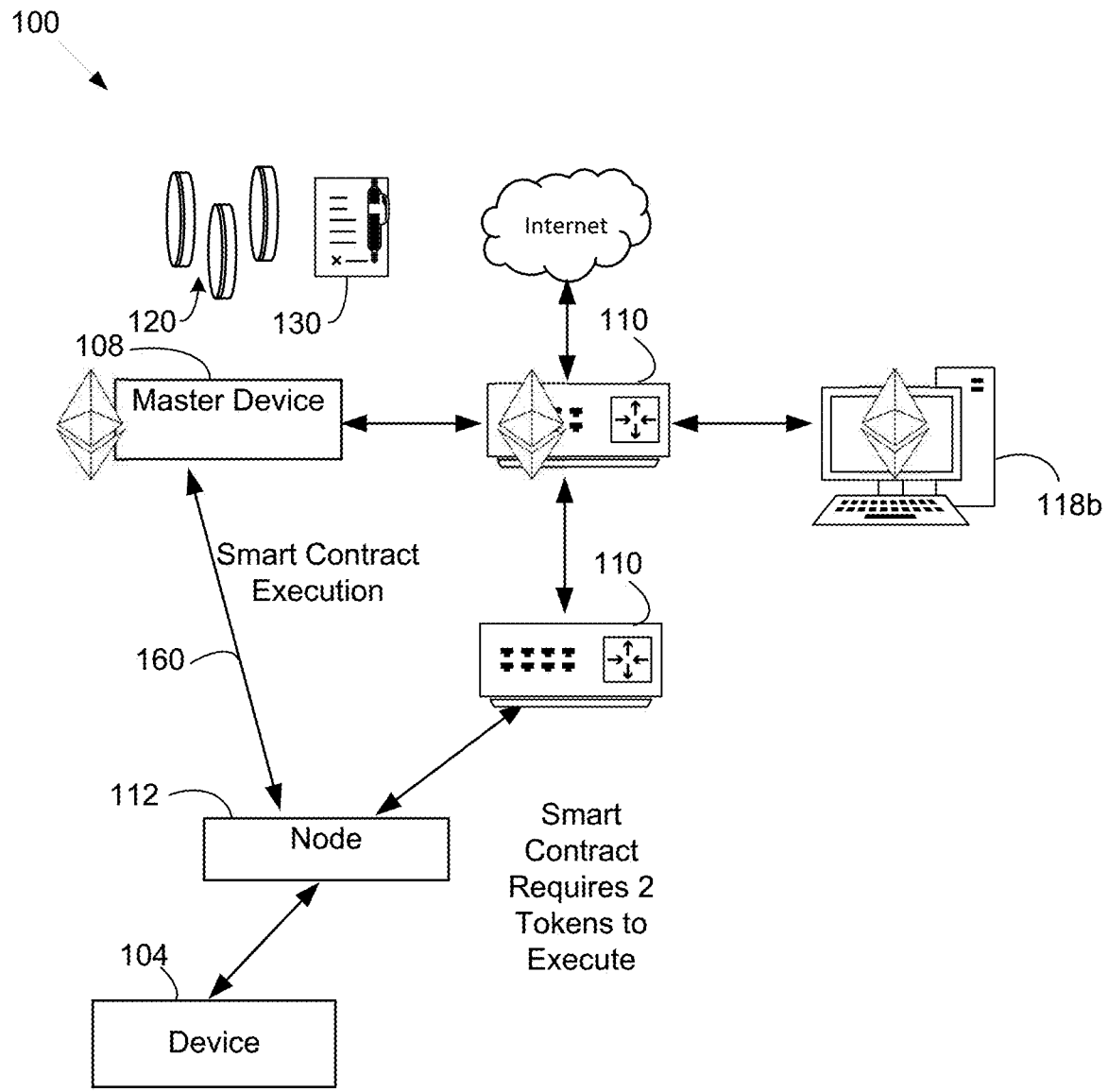
FIG. 8B illustrates an example operation of the access control system and access control method of FIG. 3, in accordance with an example embodiment.
Figure 8C:
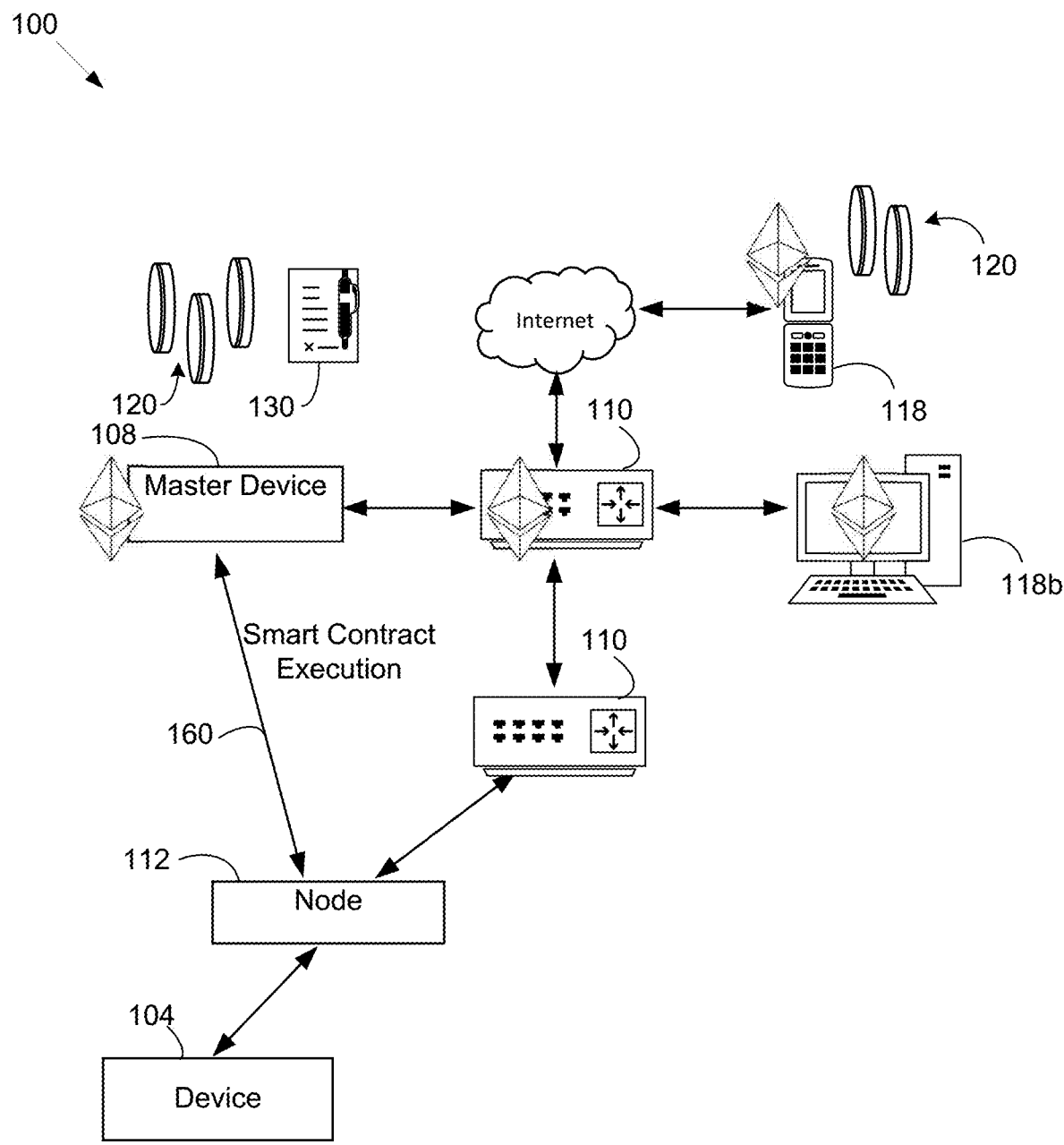
FIG. 8C illustrates an example operation of the access control system and access control method of FIG. 3, in accordance with an example embodiment.
Figure 8D:
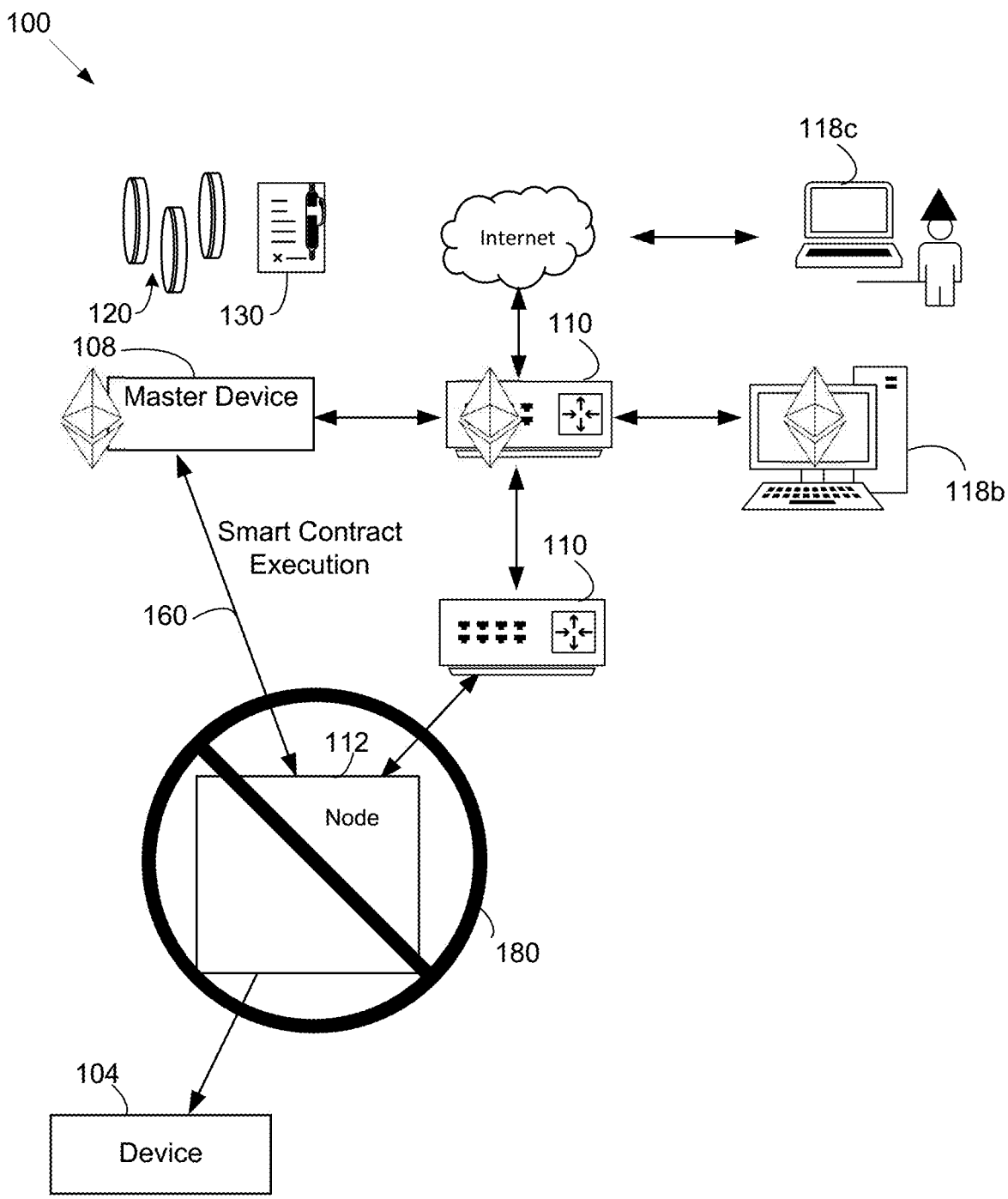
FIG. 8D illustrates an example operation of the access control system and access control method of FIG. 3, in accordance with an example embodiment.

FIG. 8B illustrates the access control system 100 executing the smart contract 130, in accordance with an example embodiment. For example, the smart contract 130 requires two tokens 120 to execute and authorize the client device 118 or the desktop computer 118b. The use of two tokens 120 can, for example, increase cybersecurity of the access control system 100. FIG. 8C illustrates an example operation of the access control system 100 authorizing access to the client device 118 when the client device 118 is accessing the local network from the Internet, in accordance with an example embodiment. For example, the client device 118 presents a token 120 (or two tokens 120 when two tokens 120 are required to satisfy the smart contract 130). The node 112 at communication 160 presents the token 120 to the master device 108 for the master device to perform proof of authority authentication using the smart contract 130, and thereafter the node 112 authorizes access between the client device 118 and the device 104. FIG. 8D illustrates the access control system 100 preventing access to a bad actor client device 118c, illustrated with a person wearing a black hat, in accordance with an example embodiment. As shown in FIG. 8D, the bad actor client device 118c does not have any token 120 (or presents an improper token). In response, when an improper token is presented, the node 112 at communication 160 presents the improper token 120 to the master device 108 for the master device to perform proof of authority authentication and the master device 108 attempts to execute the smart contract 130. The master device 108 denies authentication of the bad actor client device 118c. Therefore, the node 112 denies authentication of the bad actor client device 118c. The bad actor client device 118c is not supported on the blockchain and does not have access to any device 104 or the local network. The node 112 issues a denial of access, illustrated by stop symbol 180.

Figure 9:
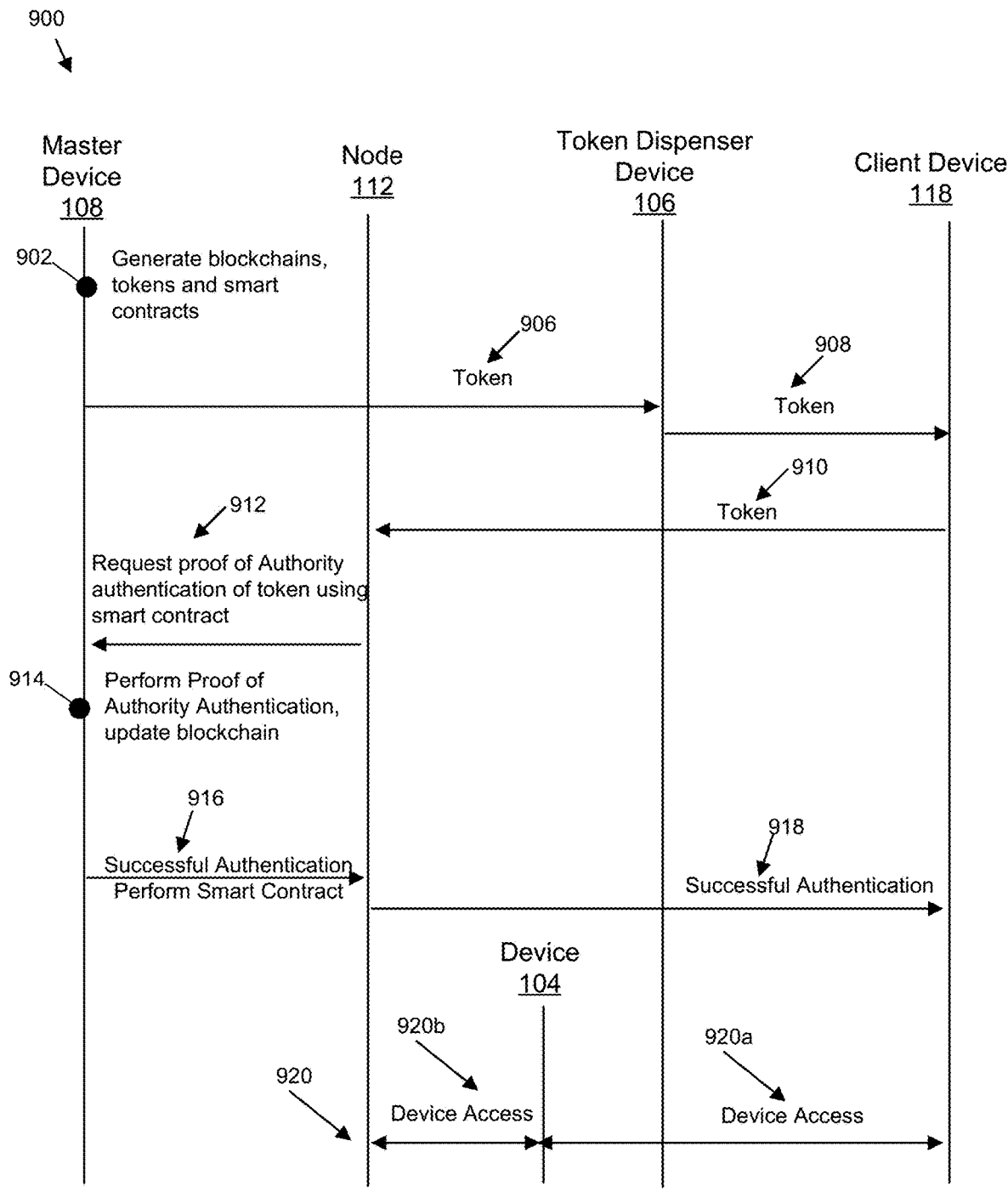
FIG. 9 illustrates a detailed example conversation of the access control access control method, in accordance with an example embodiment.

FIG. 9 illustrates a detailed example conversation of the access control method 900, in accordance with an example embodiment. In an example, the conversation is performed by the master device 108, the node 112, the token dispenser device 106, the client device 118, and the device 104. At step 902, the master device 108 generates a token 120. At step 902, the master device 108 generates a smart contract 130 and generates the blockchain 408 (first block). For example, the smart contract 130 can include instructions to perform further actions or to identify the particular device 104 to be accessed.

At step 906, the master device 108 sends the token 120 to the token dispenser device 106. In an example, the master device 108 sends the token 120 to the token dispenser device 106 through one or more wired connections and/or one or more physical proximity interfaces.

At step 908, the token dispenser device 106 sends the token 120 to the client device 118. For example, the sending of the token 120 is responsive to the client device 118 and the token dispenser device 106 being engaged over a physical proximity interface, such as tapping or physically connecting to a port or plug, or being in close physical proximity. In an example, no identifiers or credentials are required from the client device 118 to obtain the token 120. Rather, the act of being engaged over a physical proximity interface indicates that the client device 118 is at the local network, and not some remote location in the world. For example, tokens 120 cannot be dispensed over the Internet or long-range wireless protocols.

The client device 118 may wish to access a device 104 or the entire local network. At step 910, the client device 118 sends (presents) the token 120 to the node 112 (can be multiple nodes 112 in other examples). The node 112 is on the local network and is a trusted node, and therefore proof of authority authentication can be performed by the node 112 or a plurality of the nodes 112. At step 912, the node 112 sends the token 910 to the master device 108 and requests proof of authority authentication of the token 120 to determine whether the token 120, and therefore the client device 118, can be authenticated. At step 914, the master device 108 itself is a trusted source and performs proof of authority authentication. In an example, the master device 108 establishes the validity of the transaction by ensuring that the "from" account is valid and that the "from" account has the required balance. In an example, the master device 108 records the new transaction and may create a new block which can include new information such as a log of the transaction or activity. At step 916, the master device 108 advises the node 112 that the token 120 is successfully authenticated. In some examples, at step 916 the master device 108 also advises the node 112 of certain requirements of the smart contract 130 that need to be fulfilled, such as which of the devices 104 are authorized to be accessed, the time period of the access, etc. At step 918, the node 112 advises the client device 118 that the client device 118 is successfully authenticated.

The client device 118 is now authenticated by the node 112. At step 920, the client device 118 can access the device 104 on the local network. For example, referring to step 920a, the client device 118 accesses the device 104 without the node 112 as an intermediary. In another example, referring to both step 920a and step 920b, the client device 118 accesses the device 104 with the node 112 as an intermediary. In examples, now authenticated, the client device 118 can provide instructions to or receive data from the device 104. In the case of the vehicle 104a, the user can drive away with the client device 118 in the vehicle 104a, and the client device 118 and the vehicle 104a can maintain a trusted relationship secured by the blockchain 408 for a period of time (as defined by the smart contract 130 or other possible settings).

At step 902, the master device 108 can generate as many tokens 120 as required in order to fulfill demand. In other examples, the master device 108 generates a large number 120 of tokens 120 all at once, and does not generate new tokens 120 after the initial generation of tokens 120.

Figure 10:
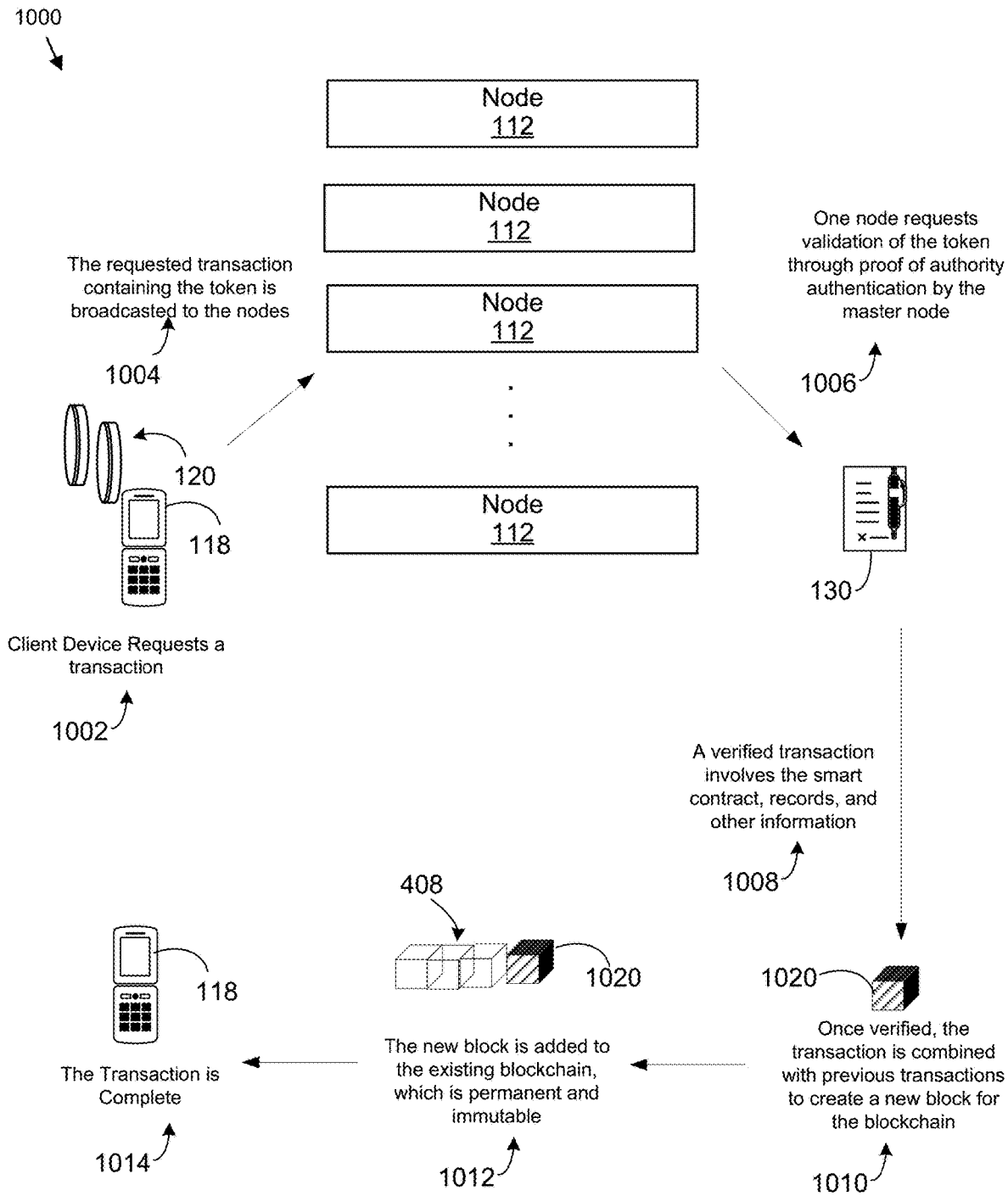
FIG. 10 illustrates a detailed example of proof of authority authentication for the access control method, in accordance with an example embodiment.

FIG. 10 illustrates a detailed example of a proof of authority authentication method 1000 for the access control method 900 of FIG. 9, in accordance with an example embodiment. In an example, the proof of authority authentication method 1000 is an example implementation of step 912 and step 914 of the access control method 900 of FIG. 9. In an example, the node 112 is a trusted node on the local network. In an example, the master device 108 is a trusted device on the local network. At step 1002, the client device 118 requests a transaction and presents a token 120, or more than one token 120 in some examples. In an example, the client device 118 presents the token 120 by using a private key and starting a transaction on the blockchain. At step 1004, the requested transaction containing the token 120 is presented to at least one of the nodes 112. At step 1006, at least one of the nodes 112 validates the token 120 by requesting proof of authority authentication from the master device 108. For example, referring to step 1008, the proof of authority authentication can include the master device 108 executing the smart contract 130. Upon successful authentication of the token 120 by the master device 108, the master device 108 sends confirmation to the node 112 that the token 120 is authenticated. At step 1010, once verified, the master device 108 combines new information relating to the transaction with previous transactions, and generates a new transaction, and/or a new block 1020, by hashing the combined information. The hash is the new block 1020 for the blockchain 408. At step 1012, the new block 1020 is added to the blockchain 408 of interest. In an example, the blockchain 408 is updated and stored across all of the other master device(s) 108. At step 1014, the transaction is complete and a notification of authorized access is sent from the node 112 to the client device 118. As well, the notification may be sent to the device 104 or an AAA server that the client device 118 is now authorized (authenticated).

Figure 11:
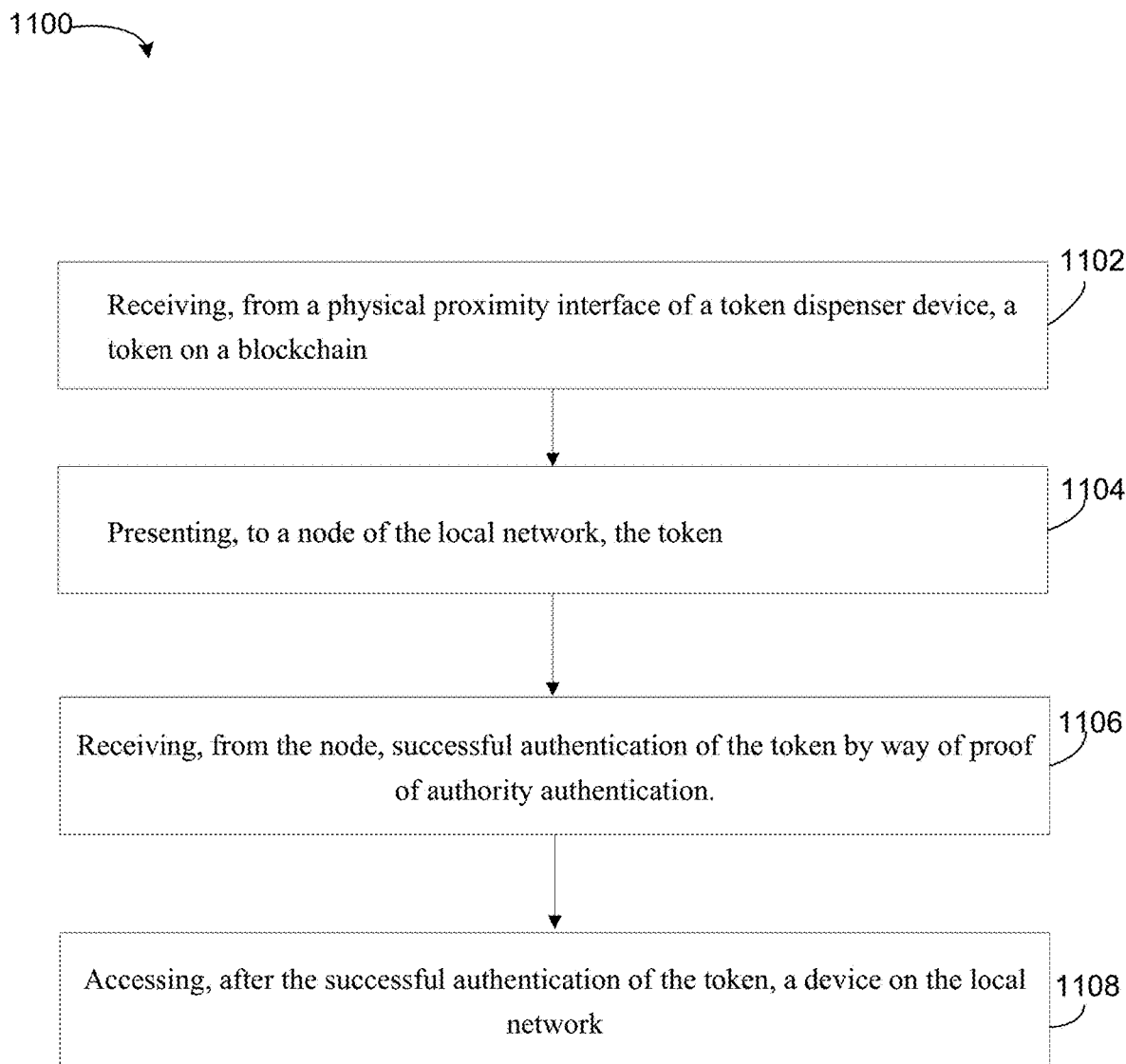
FIG. 11 illustrates another detailed example of the access control method performed by a client device, in accordance with an example embodiment.

FIG. 11 illustrates another detailed example of the access control method 1100 performed by the client device 118, in accordance with an example embodiment. At step 1102, the client device 118 receives, from a physical proximity interface of the token dispenser device 106, a token 120 on a blockchain layer. At step 1104, the client device 118 presents, to a node 112 of the local network, the token 120. At step 1106, the client device 118 receives, from the node 112, successful authentication of the token 120 by way of proof of authority authentication. For example, the client device 118 now has access to at least one device 104 on the local network. In some examples, the access control method 1100 includes step 1108, which is the client device 118 accessing, after the successful authentication of the token 120, a device 104 on the local network.

Figure 12:
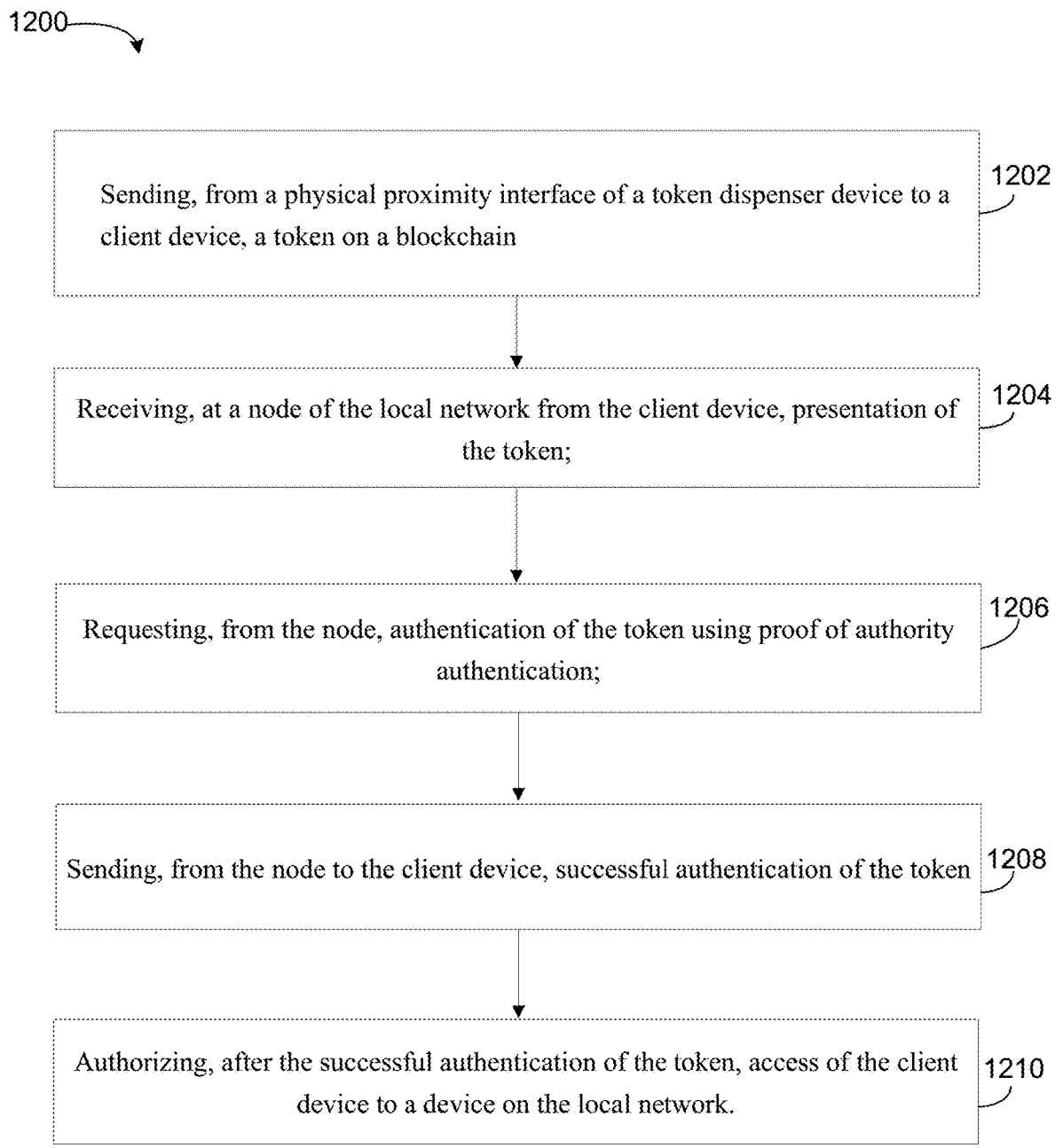
FIG. 12 illustrates another detailed example of the access control method performed by the access control system, in accordance with an example embodiment.

FIG. 12 illustrates another detailed example of the access control method 1200 performed by the access control system 100, in accordance with an example embodiment. At step 1202, the method 1200 includes sending, from a physical proximity interface of the token dispenser device 106 to the client device 118, a token 120 on a blockchain layer. At step 1204, the node 112 receives, from the client device 118, presentation of the token 120. At step 1206, the node 112 requests authentication of the token 120 using proof of authority authentication. In an example, the request is sent to the master device 108, the proof of authority authentication is performed by the master device 108, and the node 112 receives successful authentication from the master device 108. At step 1208, the node 112 sends, to the client device 118, successful authentication of the token 104. At step 1210, after the successful authentication of the token 120, the node 112 authorizes access of the client device 118 to at least one device 104 on the local network. In some examples, at step 1210 the node 112 authorizes access of the client device 118 to all devices 104 on the local network. In some examples, at step 1210 the node 112 authorizes access of the client device 118 to the entire local network.

As understood in the art, the various processes for the access control method may require gas such as Ether (ETH) for execution, which is not described in detail herein.

In the example embodiments, it should be understood that the access control system 100, the access control method, and the various devices may be implemented in other manners. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of example embodiments may be implemented in a form of a software product. The software product is stored in a storage medium, and includes several instructions for instructing a computer device (which may be a personal computer, a server, or a network device) to perform all or some of the steps of the methods and access control methods described in the example embodiments. The foregoing storage medium includes any medium that can store program code, such as a Universal Serial Bus (USB) flash drive, a removable hard disk, a read-only memory (Read-Only Memory, ROM), a random access memory (Random Access Memory, RAM), a magnetic disk, or an optical disc.

In the described methods or block diagrams, the boxes may represent events, steps, functions, processes, modules, messages, and/or state-based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described herein may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The described embodiments are considered to be illustrative and not restrictive. Example embodiments described as methods would similarly apply to systems or devices, and vice-versa.

The various example embodiments are merely examples and are in no way meant to limit the scope of this disclosure. Variations of the innovations described herein will be apparent to persons of ordinary skill in the art, such variations being within the intended scope. In particular, features from one or more of the example embodiments may be selected to create alternative embodiments comprises of a sub-combination of features which may not be explicitly described. In addition, features from one or more of the described example embodiments may be selected and combined to create alternative example embodiments comprised of a combination of features which may not be explicitly described. Features suitable for such combinations and sub-combinations would be readily apparent to persons skilled in the art upon. The subject matter described herein intends to cover all suitable changes in technology.

What is claimed is:

1. An access control method, comprising:
by a client device:
receiving, from a physical proximity interface of a token dispenser device, a token on a blockchain layer;
presenting, to a node of a local network, the token;
receiving, from the node, successful authentication of the token by way of proof of authority authentication,
wherein, after the successful authentication of the token, the client device is authorized to access a device on the local network,
wherein the device is a security monitoring device, a television, a lock, a light, a heating, ventilation and air conditioning (HVAC) device, an appliance, a computer and/or a vehicle,
wherein the device is connected to a network switch which is configured to access the local network, wherein the network switch has power activated from a relay, the access control method further comprising the node activating the relay after the successful authentication of the token; and
performing, using a master device on the local network, the proof of authority authentication and generating, by the master device, an immutable log on the blockchain layer.

2. The access control method as claimed in claim 1, further comprising accessing, after the successful authentication of the token, the device on the local network.

3. The access control method as claimed in claim 1, wherein the device is a camera.

4. The access control method as claimed in claim 1, wherein the node is an authorization service provider.

5. The access control method as claimed in claim 1, wherein the physical proximity interface includes a radiofrequency identification (RFID) interface or a Near-Field Communication (NFC) interface.

6. The access control method as claimed in claim 1, wherein the physical proximity interface includes a physical port interface.

7. The access control method as claimed in claim 6, wherein the physical port interface includes a universal serial bus (USB) port or an Ethernet port.

8. The access control method as claimed in claim 1, wherein the token is a currency token, a blockchain token, an Ethereum token, or an Ethereum Request for Comment 20 (ERC-20) token.

9. The access control method as claimed in claim 1, further comprising receiving, by the token dispenser device, the token from the master device through the physical proximity interface.

10. The access control method as claimed in claim 9, wherein the token dispenser device is directly wiredly connected to the master device, and the master device is on the local network.

11. The access control method as claimed in claim 1, wherein the receiving the token on the blockchain layer includes receiving a private key associated with the token.

12. The access control method as claimed in claim 11, wherein the proof of authority authentication includes the client device starting a transaction on the blockchain layer using the private key.

13. The access control method as claimed in claim 1, wherein the local network includes a wired local network, wherein the node is connected to the wired local network.

14. The access control method as claimed in claim 1, wherein the local network includes a wireless local network, wherein the node is on the wireless local network.

15. The access control method as claimed in claim 1, further comprising the node sending a request for the proof of authority authentication of the token to the master device on the local network.

16. The access control method as claimed in claim 1, wherein the successful authentication authorizes access to the local network.

17. The access control method as claimed in claim 1, wherein the successful authentication authorizes access to only the device and no other devices on the local network.

18. The access control method as claimed in claim 1, wherein the node is configured to control the device, wherein the successful authentication authorizes access by the client device to control the device through the node.

19. The access control method as claimed in claim 1, wherein the presenting is performed through the local network when the client device is on the local network.

20. The access control method as claimed in claim 1, wherein the presenting is performed via the Internet when the client device is remote from the local network.

21. The access control method as claimed in claim 1, wherein the receiving the token does not require any identification or credentials of the client device.

22. The access control method as claimed in claim 2, wherein the node has access to the device, wherein the accessing of the device by the client device is through the node.

23. The access control method as claimed in claim 22, wherein the node has direct wired connection to the device.

24. The access control method as claimed in claim 22, wherein the node is configured to send instructions to and/or receive data from the device.

25. The access control method as claimed in claim 2, wherein the accessing includes the client device sending an instruction to the device.

26. The access control method as claimed in claim 25, wherein the instruction to the device includes a control or a command.

27. The access control method as claimed in claim 2, wherein the accessing includes the client device receiving data from the device.

28. The access control method as claimed in claim 27, wherein the data from the device includes sensor data, image data, Internet-Of-Things (IoT) data, or user input data entered through the device.

29. The access control method as claimed in claim 1, wherein the token dispenser device is a stand alone device.

30. The access control method as claimed in claim 2, wherein the accessing is a single use or a single session with the device.

31. The access control method as claimed in claim 2, wherein the accessing is a continuous use or session with the device or the local network.

32. The access control method as claimed in claim 2, wherein the accessing is until expiration of a time period.

33. The access control method as claimed in claim 2, wherein the device is a switch or a breaker.

34. The access control method as claimed in claim 2, wherein the computer is a personal computer, a server, and/or a mobile communication device.

35. The access control method as claimed in claim 2, wherein the device is a robotic device, a sensor for the robotic device, and/or an air pressure control switch.

36. The access control method as claimed in claim 1, wherein the physical proximity interface includes a physical contact interface.

37. A client device, comprising:
a processor; and
memory containing instructions which, when executed by the processor, cause the processor to perform the access control method as claimed in claim 1.

38. An access control method, comprising:
sending, from a physical proximity interface of a token dispenser device to a client device, a token on a blockchain layer;
receiving, at a node of a local network from the client device, presentation of the token;
requesting, from the node, authentication of the token using proof of authority authentication;
sending, from the node to the client device, successful authentication of the token;
authorizing, after the successful authentication of the token, access of the client device to a device on the local network,
wherein the device is a security monitoring device, a television, a lock, a light, a heating, ventilation and air conditioning (HVAC) device, an appliance, a computer, and/or a vehicle,
wherein the device is connected to a network switch which is configured to access the local network, wherein the network switch has power activated from a relay, the access control method further comprising the node activating the relay after the successful authentication of the token; and
performing, using a master device on the local network, the proof of authority authentication and generating, by the master device, an immutable log on the blockchain layer.

39. The access control method as claimed in claim 38, further comprising:
generating, from the master device on the local network, the token,
wherein the requesting is sent from the node to the master device.

40. The access control method as claimed in claim 39, further comprising generating, from the master device, a block that includes the token and adding the block to the blockchain layer.

41. The access control method as claimed in claim 39, wherein the master device is blocked from access beyond the local network.

42. The access control method as claimed in claim 38, wherein the node is an authorization service provider.

43. The access control method as claimed in claim 38, wherein the physical proximity interface includes a radiofrequency identification (RFID) interface or a Near-Field Communication (NFC) interface.

44. The access control method as claimed in claim 38, wherein the physical proximity interface includes a physical port interface.

45. The access control method as claimed in claim 44, wherein the physical port interface includes a universal serial bus (USB) port or an Ethernet port.

46. The access control method as claimed in claim 38, wherein the token is a currency token, a blockchain token, an Ethereum token, or an Ethereum Request for Comment 20 (ERC-20) token.

47. The access control method as claimed in claim 38, further comprising receiving, by the token dispenser device, the token from the master device through the physical proximity interface.

48. The access control method as claimed in claim 47, wherein the token dispenser device is directly wiredly connected to the master device, and the master device is on the local network.

49. The access control method as claimed in claim 38, wherein the sending the token on the blockchain layer includes sending a private key associated with the token.

50. The access control method as claimed in claim 49, wherein the proof of authority authentication includes the client device starting a transaction on the blockchain layer using the private key.

51. The access control method as claimed in claim 38, wherein the local network includes a wired local network, wherein the node is connected to the wired local network.

52. The access control method as claimed in claim 38, wherein the local network includes a wireless local network, wherein the node is on the wireless local network.

53. The access control method as claimed in claim 38, further comprising the node sending a request for the proof of authority authentication of the token to the master device on the local network.

54. The access control method as claimed in claim 38, wherein the successful authentication authorizes the access to the local network.

55. The access control method as claimed in claim 38, wherein the successful authentication authorizes the access to only the device and no other devices on the local network.

56. The access control method as claimed in claim 38, wherein the node is configured to control the device, wherein the successful authentication authorizes the access by the client device to control the device through the node.

57. The access control method as claimed in claim 38, wherein the presentation is performed through the local network when the client device is on the local network.

58. The access control method as claimed in claim 38, wherein the presentation is performed via the Internet when the client device is remote from the local network.

59. The access control method as claimed in claim 38, wherein the sending the token does not require any identification or credentials of the client device.

60. The access control method as claimed in claim 38, wherein the node has access to the device, wherein the access of the device by the client device is through the node.

61. The access control method as claimed in claim 60, wherein the node has direct wired connection to the device.

62. The access control method as claimed in claim 60, wherein the node is configured to send instructions to and/or receive data from the device.

63. The access control method as claimed in claim 38, wherein the access includes instruction from the client device to the device.

64. The access control method as claimed in claim 63, wherein the instruction to the device includes a control or a command.

65. The access control method as claimed in claim 38, wherein the access includes data from the device to the client device.

66. The access control method as claimed in claim 65, wherein the data from the device includes sensor data, image data, Internet-Of-Things (IoT) data, or user input data entered through the device.

67. The access control method as claimed in claim 38, wherein the token dispenser device is a stand alone device.

68. The access control method as claimed in claim 38, wherein the access is a single use or a single session with the device.

69. The access control method as claimed in claim 38, wherein the access is a continuous use or session with the device or the local network.

70. The access control method as claimed in claim 38, wherein the access is until expiration of a time period.

71. The access control method as claimed in claim 38, wherein the device is a switch or a breaker.

72. The access control method as claimed in claim 38, wherein the computer is a personal computer, a server, and/or a mobile communication device.

73. The access control method as claimed in claim 38, wherein the device is a robotic device, a sensor for the robotic device, and/or an air pressure control switch.

74. The access control method as claimed in claim 38, wherein the physical proximity interface includes a physical contact interface.

75. A non-transitory memory containing instructions which, when executed by one or more processors, cause the one or more processors to perform the access control method as claimed in claim 1.

76. An access control system, comprising:
a token dispenser device including a physical proximity interface, the token dispenser device configured to send, from the physical proximity interface to a client device, a token on a blockchain layer;
a device on the local network, wherein the device is a security monitoring device, a television, a lock, a light, a heating, ventilation and air conditioning (HVAC) device, an appliances, a computer, and/or a vehicle; and
a node on a local network configured to:
receive, from the client device, presentation of the token,
request authentication of the token using proof of authority authentication,
transmit, to the client device, successful authentication of the token,
authorize, after the successful authentication of the token, access of the client device to a device on the local network;
a network switch connected to the device and which is configured to access the local network;
a relay for activating power to the network switch has power activated from a relay,
wherein the node is configured to activate the relay after the successful authentication of the token; and
a master device configured to perform the proof of authority authentication and generate an immutable log on the blockchain layer.

77. The access control system as claimed in claim 76, wherein the master device on the local network is configured to generate the token, wherein the request is sent to the master device.

78. The access control system as claimed in claim 77, wherein the master device is blocked from access beyond the local network.

79. The access control system as claimed in claim 76, wherein the node is an authorization service provider.

80. The access control system as claimed in claim 76, wherein the physical proximity interface includes a radiofrequency identification (RFID) interface or a Near-Field Communication (NFC) interface.

81. The access control system as claimed in claim 76, wherein the physical proximity interface includes a physical port interface.

82. The access control system as claimed in claim 81, wherein the physical port interface includes a universal serial bus (USB) port or an Ethernet port.

83. The access control system as claimed in claim 76, wherein the token is a currency token, a blockchain token, an Ethereum token, or an Ethereum Request for Comment 20 (ERC-20) token.

84. The access control system as claimed in claim 76, wherein the token dispenser device is configured to receive the token from the master device through the physical proximity interface.

85. The access control system as claimed in claim 84, wherein the token dispenser device is directly wiredly connected to the master device, and the master device is on the local network.

86. The access control system as claimed in claim 77 wherein the receiving the presentation of the token on the blockchain layer includes the client device starting a transaction with a private key associated with the token.

87. The access control system as claimed in claim 86, wherein the proof of authority authentication includes the client device starting a transaction on the blockchain layer using the private key.

88. The access control system as claimed in claim 77, wherein the local network includes a wired local network, wherein the node is connected to the wired local network.

89. The access control system as claimed in claim 77, wherein the local network includes a wireless local network, wherein the node is the wireless local network.

90. The access control system as claimed in claim 77, wherein the node is configured to send a request for the proof of authority authentication of the token to the master device on the local network, wherein the proof of authority authentication is performed by the master device.

91. The access control system as claimed in claim 76, wherein the successful authentication authorizes the access to the local network.

92. The access control system as claimed in claim 76, wherein the successful authentication authorizes the access to only the device and no other devices on the local network.

93. The access control system as claimed in claim 76, wherein the node is configured to control the device, wherein the successful authentication authorizes the access to control the device through the node.

94. The access control system as claimed in claim 77, wherein the presentation is performed through the local network when the client device is on the local network.

95. The access control system as claimed in claim 77, wherein the presentation is performed via the Internet when the client device is remote from the local network.

96. The access control system as claimed in claim 77, wherein the receiving the presentation of the token does not require any identification or credentials of the client device.

97. The access control system as claimed in claim 76, wherein the node has access to the device, wherein the access of the device by the client device is through the node.

98. The access control system as claimed in claim 97, wherein the node has direct wired connection to the device.

99. The access control system as claimed in claim 97, wherein the node is configured to send instructions to and/or receive data from the device.

100. The access control system as claimed in claim 76, wherein the access includes instruction from the client device to the device.

101. The access control system as claimed in claim 100, wherein the instruction to the device includes a control or a command.

102. The access control system as claimed in claim 76, wherein the access includes data from the device to the client device.

103. The access control system as claimed in claim 102, wherein the data from the device includes sensor data, image data, Internet-Of-Things (IoT) data, or user input data entered through the device.

104. The access control system as claimed in claim 77, wherein the token dispenser device is a stand alone device.

105. The access control system as claimed in claim 76, wherein the access is a single use or a single session with the device.

106. The access control system as claimed in claim 76, wherein the access is a continuous use or session with the device or the local network.

107. The access control system as claimed in claim 76, wherein the access is until expiration of a time period.

108. The access control system as claimed in claim 76, wherein the device is a switch or a breaker.

109. The access control system as claimed in claim 76, wherein the computer is a personal computer, a server, and/or a mobile communication device.

110. The access control system as claimed in claim 76, wherein the device is a robotic device, a sensor for the robotic device, and/or an air pressure control switch.

111. The access control system as claimed in claim 76, wherein the physical proximity interface includes a physical contact interface.

112. The access control method as claimed in claim 10, wherein the token dispenser device and the master device are configured to communicate with each other via RS485.

113. The access control method as claimed in claim 13, wherein the node is configured to communicate with the master device via RS485.

114. The access control method as claimed in claim 23, wherein the node is configured to communicate with the device via RS485.

115. The access control method as claimed in claim 48, wherein the token dispenser device and the master device are configured to communicate with each other via RS485.

116. The access control method as claimed in claim 51, wherein the node is configured to communicate with the master device via RS485.

117. The access control method as claimed in claim 61, wherein the node is configured to communicate with the device via RS485.

118. The access control system as claimed in claim 85, wherein the token dispenser device and the master device are configured to communicate with each other via RS485.

119. The access control system as claimed in claim 88, wherein the node is configured to communicate with the master device via RS485.

120. The access control system claimed in claim 98, wherein the node is configured to communicate with the device via RS485.

* * * * *